United States Patent
Bowne et al.

(10) Patent No.: US 7,289,794 B2
(45) Date of Patent: Oct. 30, 2007

(54) MOBILE COLLECTION APPLICATION

(75) Inventors: Jeffrey C. Bowne, West Hartford, CT (US); Joseph A. Milack, Clifton Park, NY (US); Jay William Carroll, Glastonbury, CT (US)

(73) Assignee: Accenture Global Services GmbH, Schaffausen (CH)

( * ) Notice: Subject to any disclaimer, the term of this patent is extended or adjusted under 35 U.S.C. 154(b) by 1136 days.

(21) Appl. No.: 10/391,430

(22) Filed: Mar. 18, 2003

(65) Prior Publication Data

US 2004/0203668 A1 Oct. 14, 2004

Related U.S. Application Data

(60) Provisional application No. 60/402,587, filed on Aug. 9, 2002.

(51) Int. Cl.
*H04M 3/42* (2006.01)
*H04M 3/493* (2006.01)
*H04B 1/38* (2006.01)

(52) U.S. Cl. .............................. 455/414.1; 455/414.2; 455/556.1; 455/556.2; 709/203

(58) Field of Classification Search .. 455/414.1–414.4, 455/556.1, 556.2, 557; 709/203
See application file for complete search history.

(56) References Cited

U.S. PATENT DOCUMENTS

2002/0055861 A1* 5/2002 King et al. .................... 705/4
2002/0178216 A1* 11/2002 Walther et al. ............. 709/203

\* cited by examiner

*Primary Examiner*—Harry S. Hong
(74) *Attorney, Agent, or Firm*—Brinks Hofer Gilson & Lione

(57) ABSTRACT

A mobile collection application is disclosed that is capable of providing collection data to a field agent on a wireless pocket PC. A collection case inventory module is used to generate a list of collection cases on the wireless pocket PC. The field agent may view a detailed report of collection cases that are contained in the list of collection cases. A payment plan component is also provided that allows the field agent to work out a payment plan with the debtor. The mobile collection application is also capable of allowing field agents to register transient taxpayers for the purpose of collecting sales and use taxes.

61 Claims, 23 Drawing Sheets

MOBILE COLLECTION APPLICATION

This application claims the benefit of U.S. Provisional Application Ser. No. 60/402,587, filed Aug. 9, 2002.

FIELD OF THE INVENTION

The present invention relates generally to portable computing and, more particularly, to a mobile collection application for wireless terminals that allow field agents to retrieve collection case information and interact with debtors concerning collection accounts.

BACKGROUND OF THE INVENTION

The use of electronic work support tools in the field of collections, and, in particular, in the field of tax collections, has been limited because of the nature and dynamics of field visits. Field collection visits are generally brief and typically only last 15 to 20 minutes. They also involve visits with individuals or businesses that may be avoiding payment for various reasons. As such, they may involve hostile interactions that require collectors to be alert and able to operate quickly. A field agent may need to leave quickly and typically is not provided with an opportunity to plug-in a laptop computer and sit back and allow time for the computer to boot-up for the collection process. In addition, laptop computers require large amounts of workspace, which is typically not available to field agents during a field visit.

Field collection visits also require complete information about account and collection histories that require the collectors to carry printouts or copies of account and collection histories for various individuals and businesses. Field collection visits may conclude with the acceptance of payment, establishing a payment agreement, or other legal documents that are precursors to stronger collection enforcement actions.

Laptop computers and other similar devices could accommodate the need for access to information that collectors need in order to address issues with individuals or companies who are behind in payments. However, the time requirements for "booting up," the need for large amounts of desk space, limited battery life and the inability of the collector to fully interact with the debtor while maintaining complete physical control of the device render laptop computers and similar devices impractical during a collection visit. Since laptop computers are impractical for these types of interactions, many field agents or collectors still rely on paper printouts to review collection cases with individuals or businesses.

As such, a need exists for a mobile collection solution that is capable of providing field agents with information about a debtor in a quick and compact format that allows field agents to resolve delinquency issues with debtors.

SUMMARY OF THE INVENTION

An embodiment of the present invention discloses a method and system for providing collection data to a field agent during a field interview using a wireless pocket personal computer (PC). During operation, a field agent logs into a mobile collection application located on the wireless pocket PC. In response to the selection of a main menu option, the mobile collection application may retrieve a collection case inventory from a collection data center server. The collection case inventory may be retrieved by the use of a wireless access network that connects the wireless pocket PC to the collection data center server. The collection case inventory is then displayed on a display of the wireless pocket PC. The field agent can then select a collection case entry that is listed in the collection case inventory and a detailed collection case report may be generated on the display of the pocket personal computer based on the selected collection case entry.

The detailed collection case report may include a link to a payment plan component of the mobile collection application that allows the field agent to setup a payment plan with the debtor or taxpayer. The payment plan component may allow the field agent to enter data items in a form and then will calculate a payment plan as a function of the data items that are entered in the form for that particular payment plan. If the payment plan is approved by the taxpayer and the field agent, a collection database on the data collection center server may be updated accordingly with the details of the payment plan. A printer may be connected with the wireless pocket PC to printout a receipt for the taxpayer.

The mobile collection application may also include a collection case search component that allows the field agent to search for particular collection cases within the collection database of the data collection center server. The collection case search component may generate a collection case search form that includes a plurality of search parameter data entry fields. The field agent will use the search parameter data entry fields to narrow a search for a particular collection case. A search results display field may be used to display search results as the field agent begins entering search parameters.

Another embodiment of the present invention discloses a method and system for registering taxpayers and collecting taxes in a single interaction with a wireless pocket PC being used by a field agent during a field interview. In this embodiment, a taxpayer registration form is generated on a display of the wireless pocket PC. The taxpayer registration form may include a plurality of taxpayer information data entry fields that may be filled in by the field agent. A tax calculation form may then be generated on the display of the wireless pocket personal computer and the field agent may enter tax information in the tax calculation form using the wireless pocket PC. A total tax amount due based on the tax information entered in the sales tax calculation form is then calculated by the wireless pocket PC based on a predetermined tax rate. The tax rate may be set by the field agent, the wireless pocket PC or the collection data center server.

The taxpayer information and the total tax amount due may be stored in a collection database on the wireless pocket personal computer or a collection database on the data collection center server. Preferentially, a taxpayer file is created in the collection database associated with the collection data center server based on the taxpayer information and the total tax amount due. The tax calculation for may be a sales tax calculation form including a plurality of data entry fields that may be selected from a group of data entry fields including a total sales data entry field, a taxable sales data entry field, a taxable purchases data entry field and a tax rate data entry field.

A total amount of tax due display field may be generated on the display of the wireless pocket PC based on the total tax amount due. A tax verification form may also be generated on the display of the wireless pocket PC that includes an itemized index field that summarizes the field interview. A payment processing component of the mobile registration application may be used by the taxpayer or field agent to pay for the total amount of tax due. A receipt may then be printed out with a printer connected with the wireless pocket PC.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS OF THE INVENTION

Figure 1:
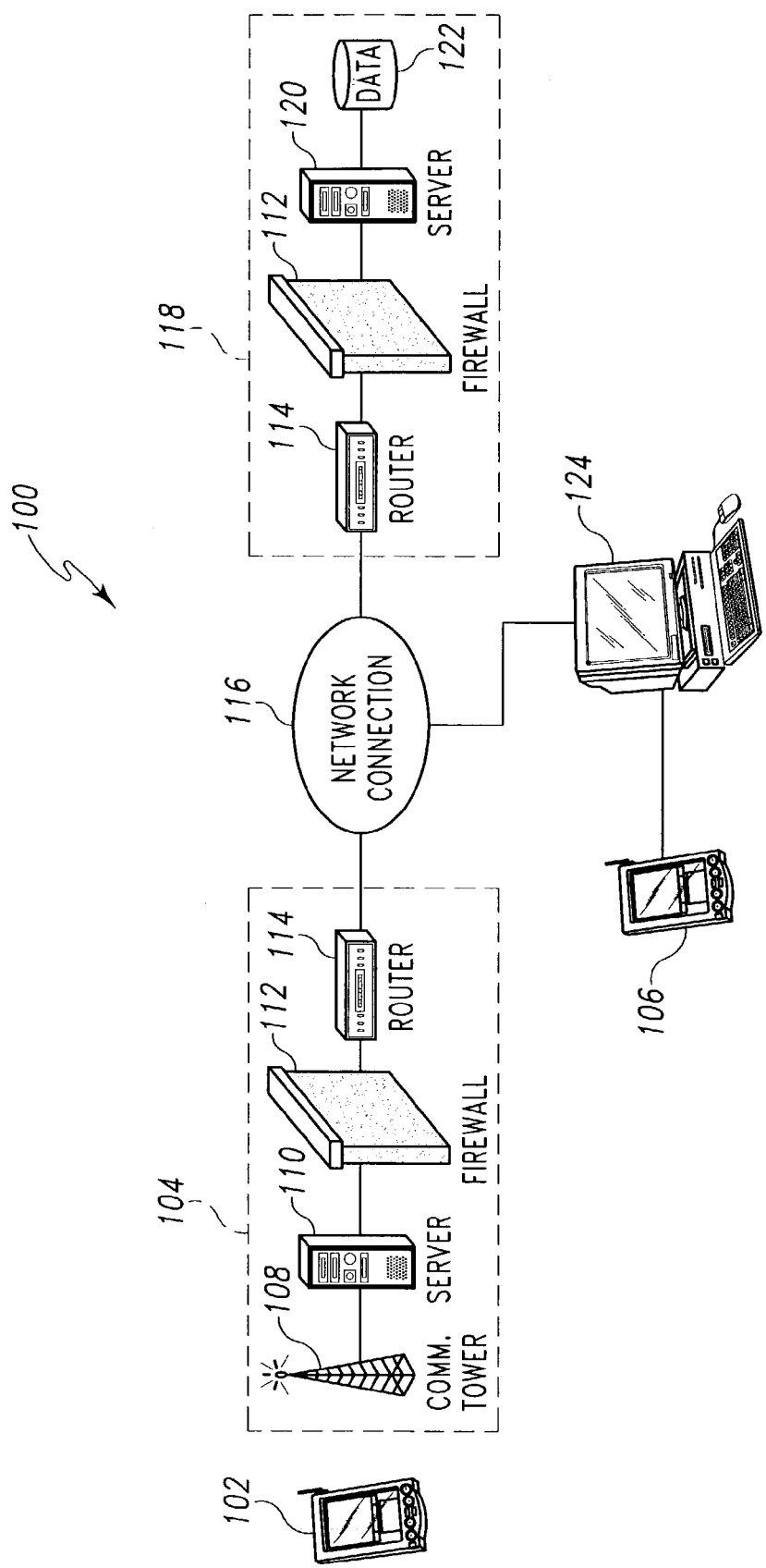
FIG. 1 is a system architectural view of a mobile collection system for use with wireless pocket personal computers.

Referring to FIG. 1, a preferred embodiment of the present invention discloses a mobile collection system 100.

The preferred mobile collection system 100 includes a wireless pocket PC 102 that may be connected to a wireless access network 104. The term wireless pocket PC 102 should be broadly construed to include any type of mobile computing device that is capable of establishing a wireless connection with a data server and allowing a field agent to interact with data files contained on the data server. A non-wireless or standard pocket PC 106 may also use the mobile collection system 100 as well by using a docking station to connect to a personal computer.

In addition to a wireless pocket PCs 102, the present invention may be used in conjunction with personal digital assistants and any mobile computing device that may be used as a "dumb terminal". Some illustrative pocket PCs that may be used by the present invention include the HP iPaq Pocket PC H5450, Audiovox Thera, Toshiba 2032, Siemens/AT&T Wireless SX56, T-Mobile Pocket PC, Compaq iPaq Pocket PC H3760/H3765 and so forth. For the purpose of the present invention, it is important to note that the mobile computing device used is small and compact, which allows field agents to move quickly in case a field visit turns hostile.

The wireless access network 104 may include a base station 108 that may be connected to an access network server 110. The access network server 110 may include a firewall 112 or the firewall 112 may be installed on a computer that may be connected with the access network server 110. A router 114 may be connected with the access network server 110 and may be used to send and receive data across a network connection 116. The network connection 116 may be a virtual private network (VPN), an Internet-based network connection or any other type of network connection that may be used to transfer data over a network. Those skilled in the art should recognize that several different types of components and devices may be used to transmit data over a network.

The wireless access network 104 may be connected to a collection data center 118. The collection data center 118 may include a collection data center server 120 that may be connected with the network connection 116. The collection data center server 120 may include or be connected with a collection database 122. The collection database 122 may include a plurality of data files that relate to individuals or businesses. For example, the collection database 122 may include a plurality of tax records related to individuals and businesses. However, other types of collection records and data may also be contained in the collection database 122 that relate to a broad range of debtors. The collection data center server 120 may also be connected with a router 114 and a firewall 112 to establish the connection between the collection data center server 120 and the network connection 116.

Figure 2:
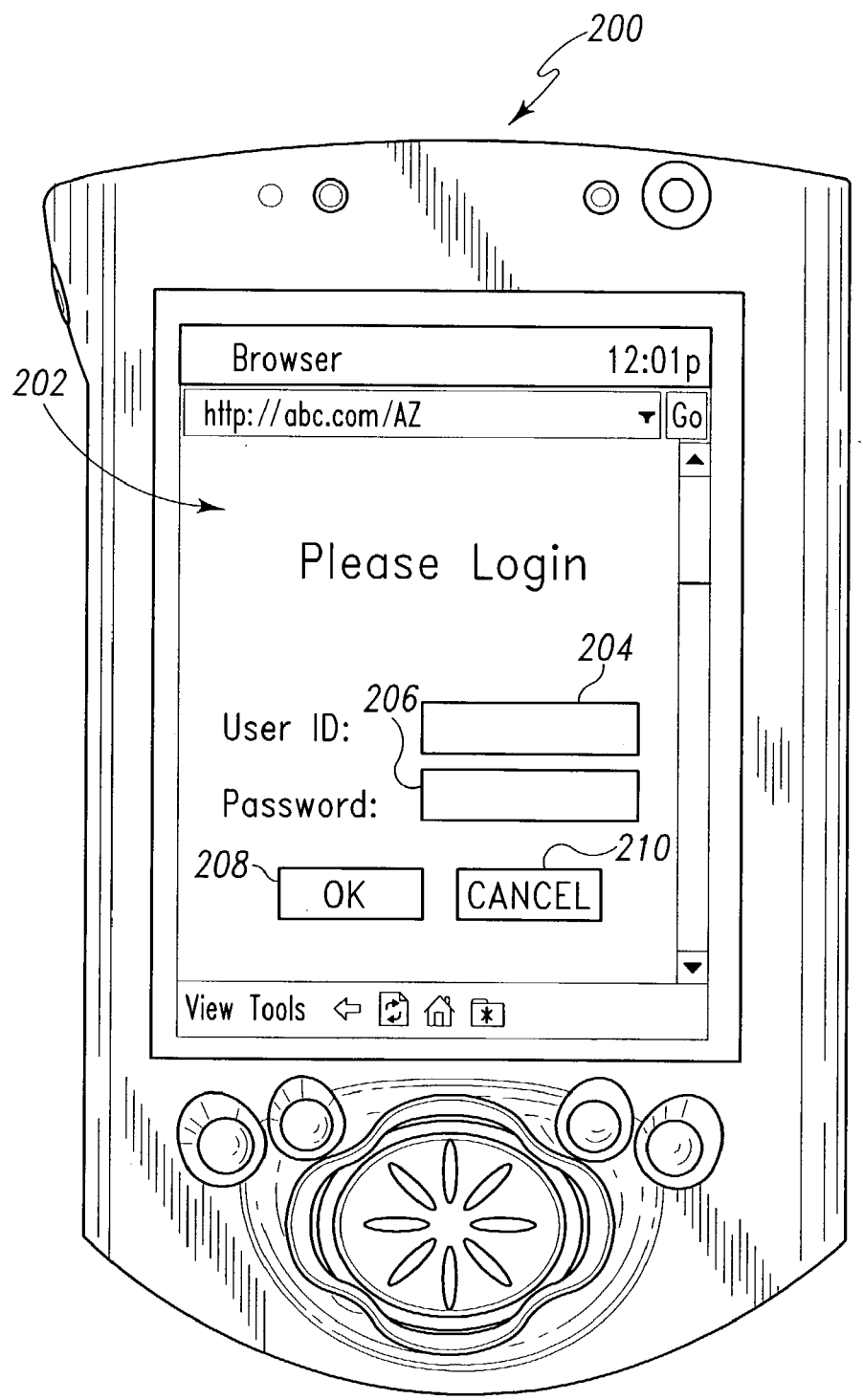
FIG. 2 illustrates a representative authentication graphical user interface that is generated by the mobile collection application.

Referring to FIG. 2, the mobile collection system 100 includes a mobile collection application 200 that is installed on the wireless pocket PC 102. In one embodiment, whenever the wireless pocket PC 102 is powered on or rebooted, a field agent may be presented with an authentication graphical user interface (GUI) 202. A collection application icon located on the desktop of the wireless pocket PC 102 may also start the mobile collection application 200. The authentication GUI 202 may prompt field agents to enter a username and a password in a user ID field 204 and a password field 206. Upon entering an appropriate username and password, the field agent will click on a Login icon 208. A Cancel icon 210 may also be included that allows the field agent to exit the mobile collection application 200.

To authenticate the field agent, the mobile collection application 200 may establish a connection to the collection data center server 120. After connecting to the collection data center server 120, the credentials entered by the field agent may be transmitted to the collection data center server 120 using the network connection 116. The collection data center server 120 includes an authentication application that uses the credentials to authenticate the field agent against a mobile user directory that may be contained within the collection database 122. Although not specifically illustrated, an authentication server may be used to authenticate the wireless pocket PC 102. The authentication server may be connected to the network connection 116 or the collection data center server 120.

If the credentials presented by the field agent are valid, then a token with an expiration date may be generated and returned to the wireless pocket PC 102. If the credentials are invalid, then the field agent will be informed to attempt to login again. Once the number of login attempts exceeds a predetermined threshold value, then the account associated with that field agent may be locked out and any local collection database replicas may be automatically deleted from the wireless pocket PC 102. The validated credential set along with the token may be encrypted and cached on the wireless pocket PC 102 until the field agent finishes the application session or the token automatically expires after a predetermined time period. The cached credentials and token are preferentially used to authenticate the field agent whenever a connection is established and data is transferred between the wireless pocket PC 102 and the collection data center server 120.

After the field agent logs into the mobile collection application 200, the collection data center server 120 may download or transfer all or part of the data related to collection cases that the field agent needs to address or work on directly to the wireless pocket PC 102. The collection case information may be stored in the wireless pocket PC 102 so that the wireless pocket PC 102 does not have to establish a connection with the wireless access network 104 in order to retrieve data from the collection data center server 120. In alternative embodiments, the wireless pocket PC 102 may establish a connection with the wireless access network 104 each time the field agent needs to retrieve or send data to the collection database 122. Other wireless access networks 104 that may be used by the present invention allow wireless communication devices to constantly be connected to the wireless access network 108 thereby eliminating the need to transfer any data files to the wireless pocket PC 102 unless requested by the field agent during operation.

Figure 3:
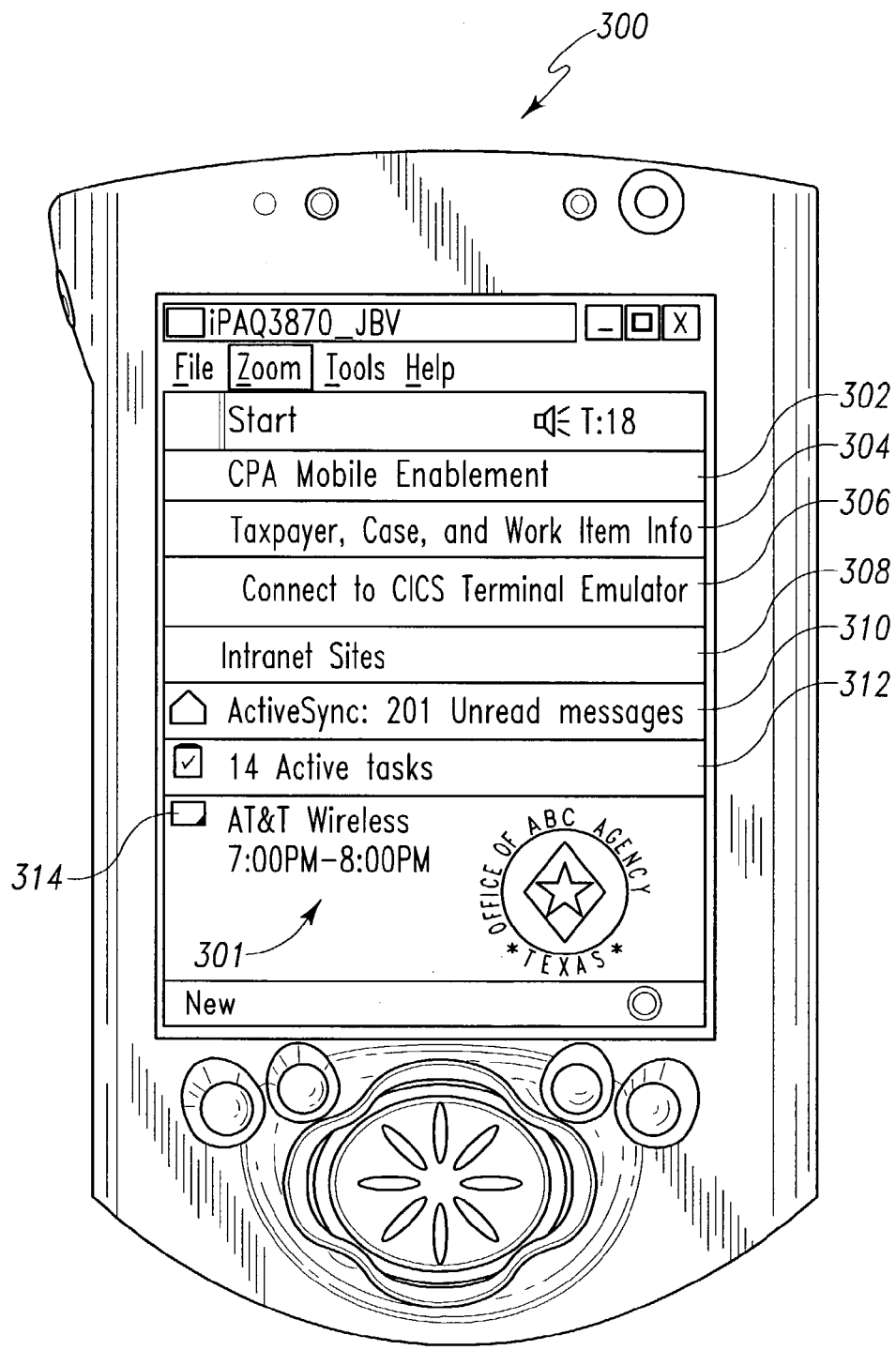
FIG. 3 illustrates a representative main agenda interface graphical user interface of the mobile collection application.

Referring to FIG. 3, after the field agent has successfully completed the login process, the mobile collection application 200 may launch a main agenda interface module 300. The main agenda interface module 300 may generate an agenda interface GUI 301 on the display of the wireless pocket PC 102. The agenda interface GUI 301 may be the desktop or main interface from which field agents interact with the mobile collection application 200. The agenda interface GUI 301 may include a branded theme and links to all of the core applications or tools that are used by the field agent during the course of a normal workday. The branded theme may be represented as an icon, an animated icon, a trademark, a service mark or any other type of name, symbol, or device that may be used to designate a source. FIG. 3 represents an illustrative implementation of the mobile collection application 200 for the Office of ABC Agency for the State of Texas, which should not be construed as a limitation of the present invention.

The agenda interface GUI 301 may be broken into a plurality of key work sections or groupings where a single tap or selection of the screen or the selection of a work section with a pointing device will launch or activate each software module or tool represented by the selected work section or grouping. The work sections or groupings may be in the form of icons or text or a combination of both. The applications or tools provided in the work sections could be setup or designed in several different formats.

Figure 4:
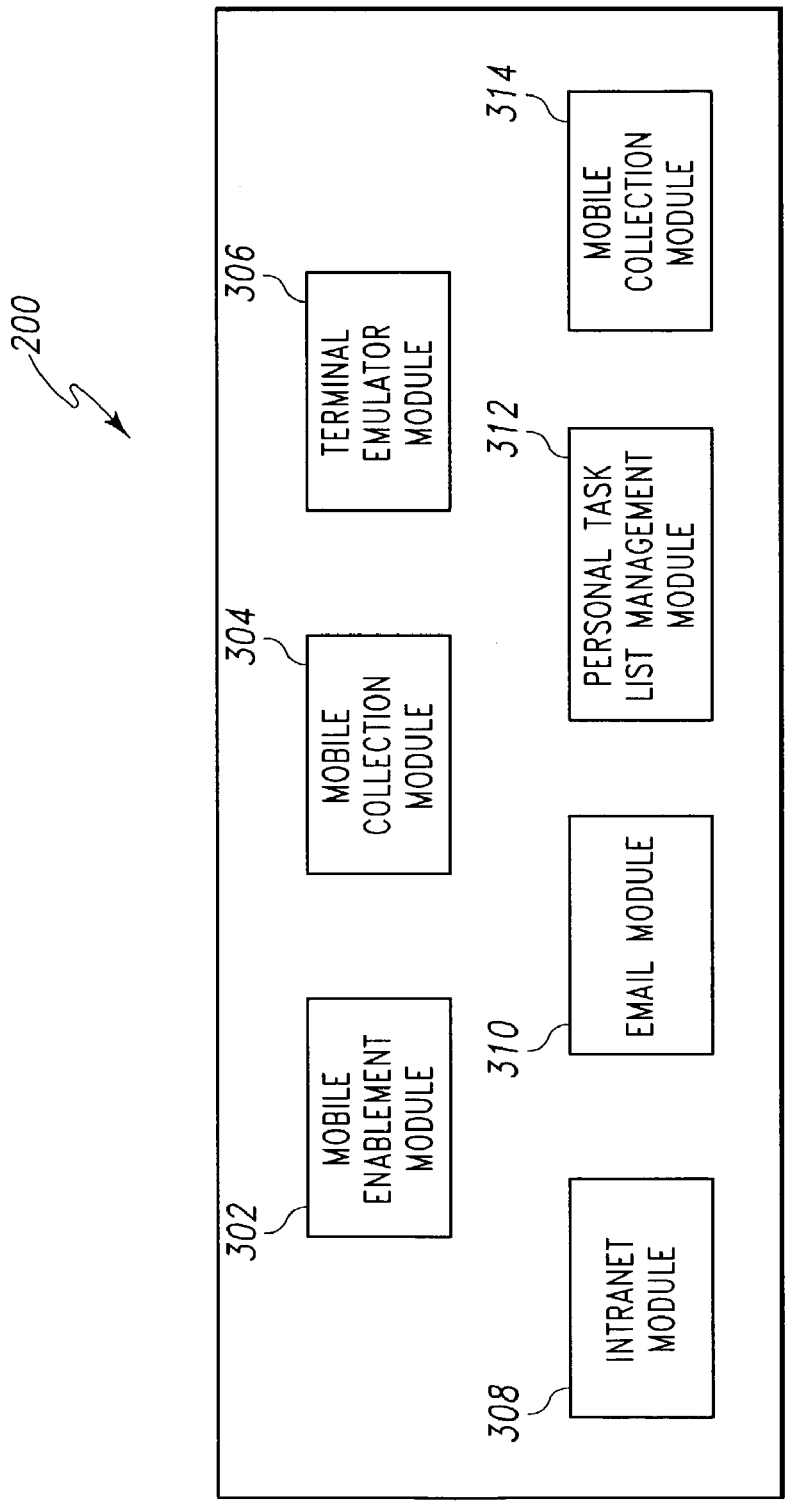
FIG. 4 is a block diagram illustrating application modules of the mobile collection application.

Referring collectively to FIGS. 3 and 4, the agenda interface GUI 301 may include several work sections that provide links to software modules that may include a mobile enablement module 302, a mobile collection module 304, a terminal emulator module 306, an intranet module 308, an email module 310, a personal task list management module 312 and a personal calendar module 314. The agenda interface GUI 301 acts as a main menu to the modules or tools that are provided within the mobile collection application 200. Solutions for different companies, agencies and types of field agents may require modification of the number of software modules that are presented to the field agents through the wireless pocket PC 102. As such, other software modules may also be included in the agenda interface GUI 301.

The mobile enablement module 302 provides a help desk application that provides links to information about application support, links to technical information, links to a consumable reordering application (e.g.—for ordering paper, ink and styluses) and links to answers of frequently asked questions about the mobile collection application 200. The help desk application may be presented in a searchable HTML format on the wireless pocket PC 102. A browser may be used to present the information contained in the mobile enablement module 302 to the field agent.

The wireless pocket PC 102 may receive most of the information and services provided by the help desk application from the collection data center server 120. The data may be stored on the collection data center server 120 or on another server connected with the network connection 116 and transmitted to the wireless pocket PC 102 in several different types of file formats, such as an active server page for instance. Varying amounts of information provided by the help desk application may be stored on the wireless pocket PC 102. The information stored on the wireless pocket PC 102 may be updated by the collection data center server 120 as necessary or on a regularly scheduled basis.

The terminal emulator module 306 provides a terminal emulator that allows the wireless pocket PC 102 to emulate a particular type of terminal in order to gain access to data that may be stored on the collection data center server 120. The terminal emulator module 306 may allow the wireless pocket PC 102 to establish a connection with a legacy data system or application (not illustrated) that may be located on the collection data center server 120 or connected with the collection data center server 120. This allows the field agent to access data contained on legacy systems or applications that may be required to obtain or update needed information or data. The wireless pocket PC 102 may connect to the collection data center server 120 to obtain or update information or data through the terminal emulator as needed or to run an application on the collection data center server 120.

The intranet module 308 provides a link or bookmark to key intranet information or data files that may be used by the field agents. The information provided through the intranet module 308 may be company or agency news items, a periodic bulletin or a news flyer or other types of organizational information. The information provided by the intranet module 308 may be provided in a web page format, a text-based format or in any other suitable type of data format. In one embodiment, the information may be provided to the field agents using a browser that is installed on the wireless pocket PC 102.

The email module 310 provides access to an electronic mail application that is associated with the field agent using the mobile collection application 200. The email module 310 allows the field agent to access electronic mail and provides the field agent with the ability to send and receive electronic mail using the wireless pocket PC 102. During operation, the email module 310 synchronizes the email account inbox on the wireless pocket PC 102 with an email account that may be located on the collection data center server 120. Neither the email account nor the email application have to be stored on the collection data center server 120 and may be stored or provided by another server or third-party that is connected with the collection data center server 120 or the network connection 116.

The personal task list module 312 is responsible for generating a list of personal tasks that are managed and maintained by the field agent. The personal tasks may be entered by the field agent using a task management interface provided by the personal task list module 312. Personal tasks for a particular field agent may also be entered by a person located in the home or regional office of the field agent. For example, a personal assistant of the field agent may enter a task for the field agent if the field agent is out of the office.

Although not illustrated, a task list management application located on the collection data center server 120 may be used by third-parties to enter personal tasks for a particular field agent. This allows a field agent to receive an assigned task list that may be stored and displayed on the wireless pocket PC 102. The personal tasks associated with a respective field agent may be stored on the wireless pocket PC 102, the collection data center server 120 or any other type of data storage device connected with the network connection 116. The personal task list associated with a field agent may be updated at login, periodically throughout a session or whenever a third-party enters a task using the task list management application.

The personal calendar module 314 provides an electronic calendar to the field agent. The personal calendar module 314 may also allow the field agent to enter, modify and delete notes on particular dates contained in the calendar. The calendar may contain a list of personal calendar events and reminders that are managed and maintained by the field agent. The items contained in the calendar may be stored on the wireless pocket PC 102, the collection data center server 120 or any other type of data storage device connected with the network connection 116. In addition, the events listed in the calendar may also be modified by a field agent calendar interface located on the collections data center server 120. This also allows other individuals to enter items on a field agent's calendar. The collection data center server 120 may update a field agent's wireless pocket PC 102 at login or periodically throughout a session.

Figure 5:
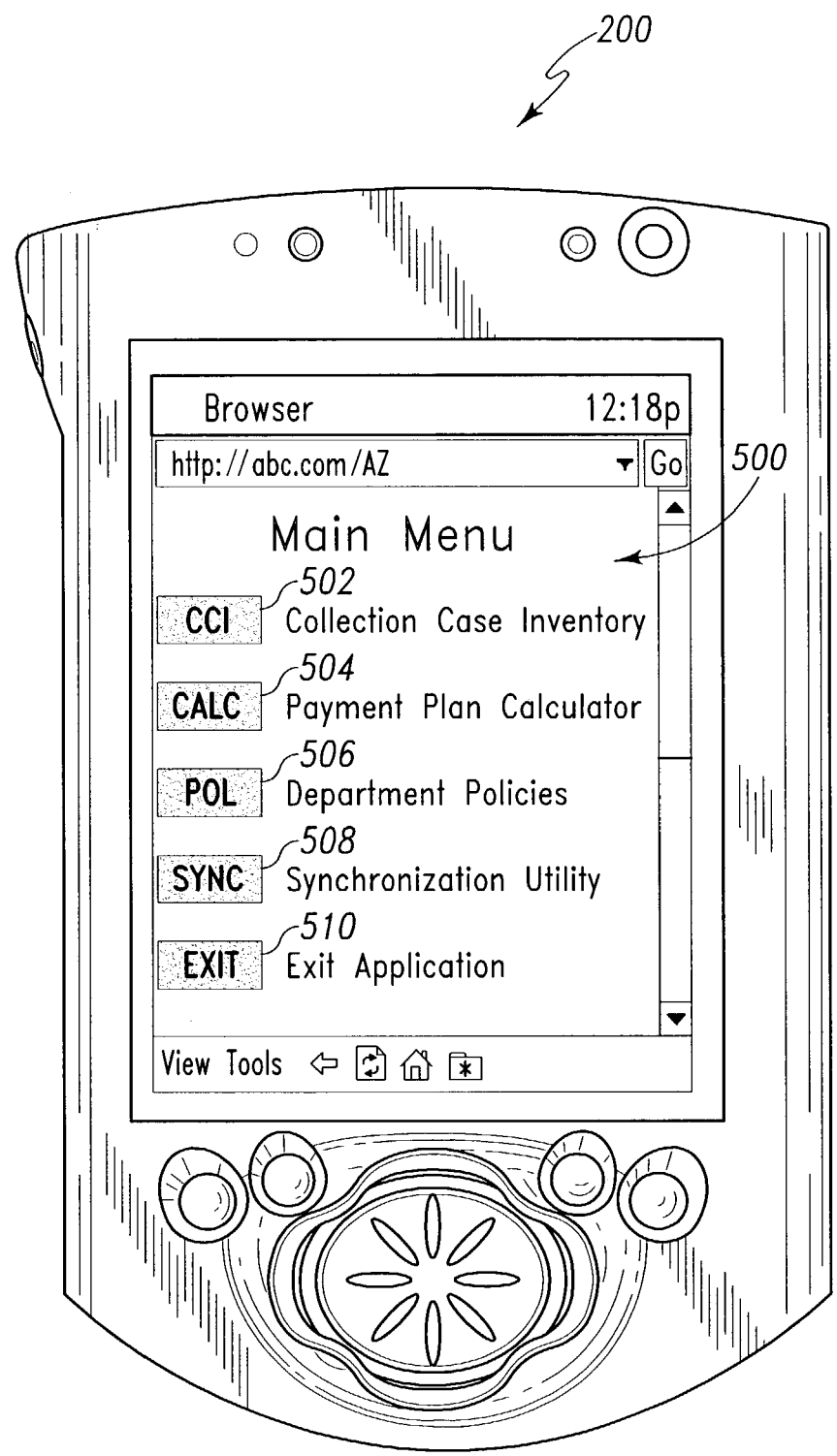
FIG. 5 illustrates a representative mobile collection main menu graphical user interface of the mobile collection application.

Referring to FIG. 5, selection of the mobile collection module 304 of the mobile collection application 200 may generate a collection main menu GUI 500. The collection main menu GUI 500 includes a plurality of selection icons that are capable of providing field agents with access to other tools or components of the mobile collection application 200. These components may include a collection case inventory component 502, a payment plan calculator component 504, a department policies component 506, a synchronization utility component 508 and an exit component 510.

Selection of any of these selection icons starts the corresponding component of the mobile collection application 200. The exit component 510 may return the mobile collection application 200 to the agenda interface GUI 301 or exit the mobile collection application 200 entirely.

Figure 6:
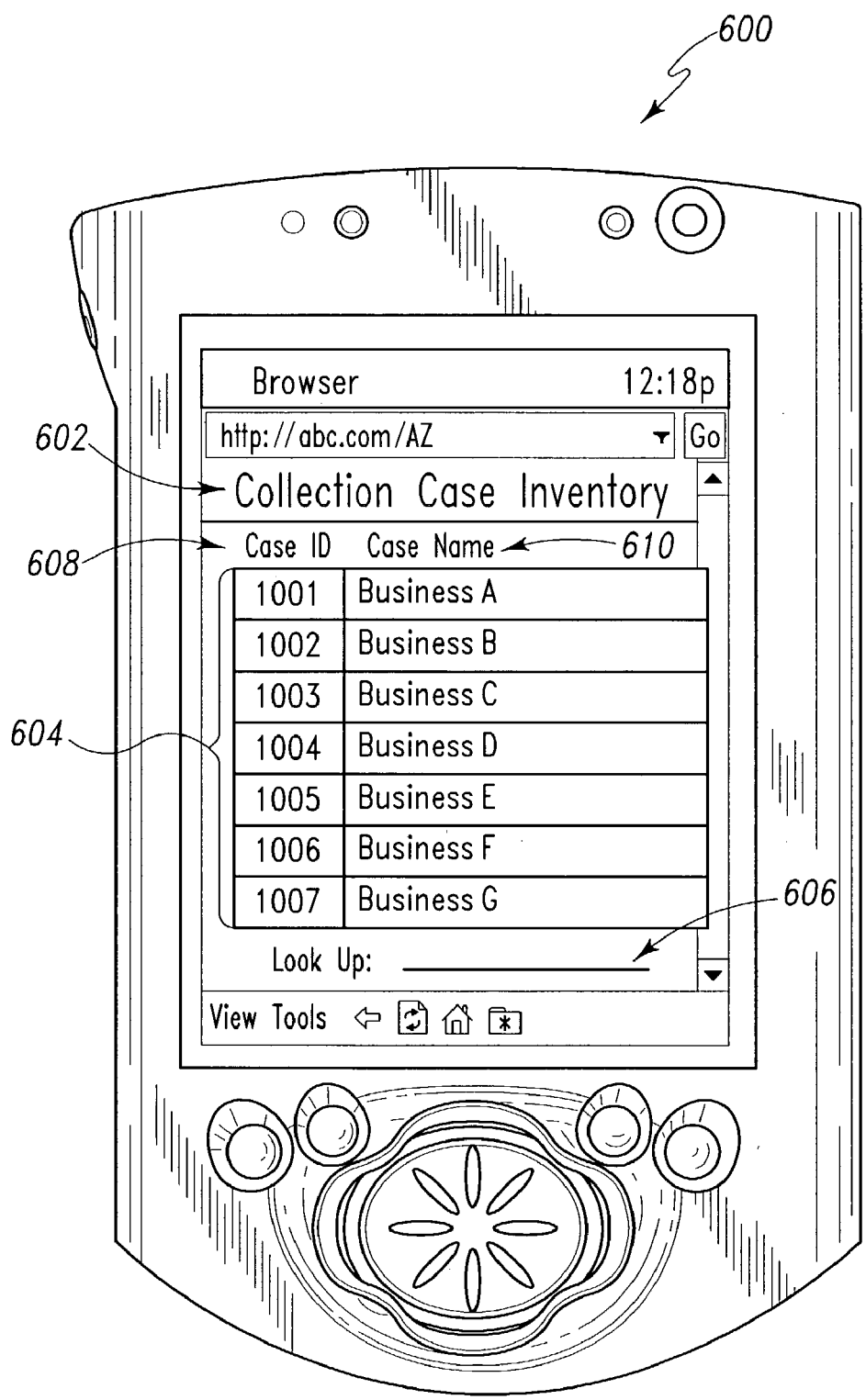
FIG. 6 illustrates a representative collection case inventory graphical user interface generated by the mobile collection module of the mobile collection application.

Referring to FIG. 6, if a field agent selects the selection icon that is associated with the collection case inventory component 502, the mobile collection application 200 may start a collection case inventory component 600. The collection case inventory component 600 may generate and display a collection case inventory GUI 602 on the wireless pocket PC 102. The collection case inventory GUI 602 may include a list of collection cases 604. The list of collection cases 604 may be collection cases that are assigned to the field agent or collection cases that are presented in numeric or alphabetical order. The list of collection cases 604 may also be a quick summary of the field agent's workload for a particular day, week or designated period of time. The list of collection cases 604 may be generated as a function of the field agent's personal task list or a personal calendar. Several different collection cases may be included in the list of collection cases 604 and several different screens may be required to view the entire list or a scroll bar may be used to scroll through the list of collection cases 604.

To generate the list of collection cases 604, the wireless pocket PC 102 may connect to the collection data center server 120 and retrieve the required information from the collection database 122 on an as-needed basis. The list of collection cases 604 may be transferred to the wireless pocket PC 102 when the field agent selects the collection case inventory component 502. In the alternative, the wireless pocket PC 102 may connect to the collection data center server 120 at a predetermined period of time and download or replicate the collection data required for use by a particular field agent on the wireless pocket PC 102. As set forth in greater detail below, the field agent may also use a collection case search query field 606 to retrieve data about a particular collection case.

Although not illustrated, a collections application on the collection data center server 120 may be operable to generate the list of collection cases 604 that are assigned to the field agent for any given period of time or as requested by the field agent. The collections application may assign delinquent accounts to field agents for the purpose of the field agent attempting to collect money owed or to work out a payment plan during a field visit with individuals or businesses having delinquent accounts. The collections application is responsible for responding to requests for information that are generated by the wireless pocket PC 102 by locating the information from the collection database 122 and sending the corresponding data back to the wireless pocket PC 102.

As illustrated in FIG. 6, the list of collection cases 604 may be organized and displayed to the field agent using a case identification (ID) 608 and a case name 610. The collection case inventory component 600 may also include a collection case search query field 606 that allows the field agent to look up or retrieve collection cases information for individuals or businesses that are not listed in the list of collection cases 604 that may be generated by the collection case inventory application 600. The field agent may enter a case ID 608 or a case name 610 (business name) in the entry field provided by the collection case search query field 606 in order to retrieve a particular collection case.

Figure 7:
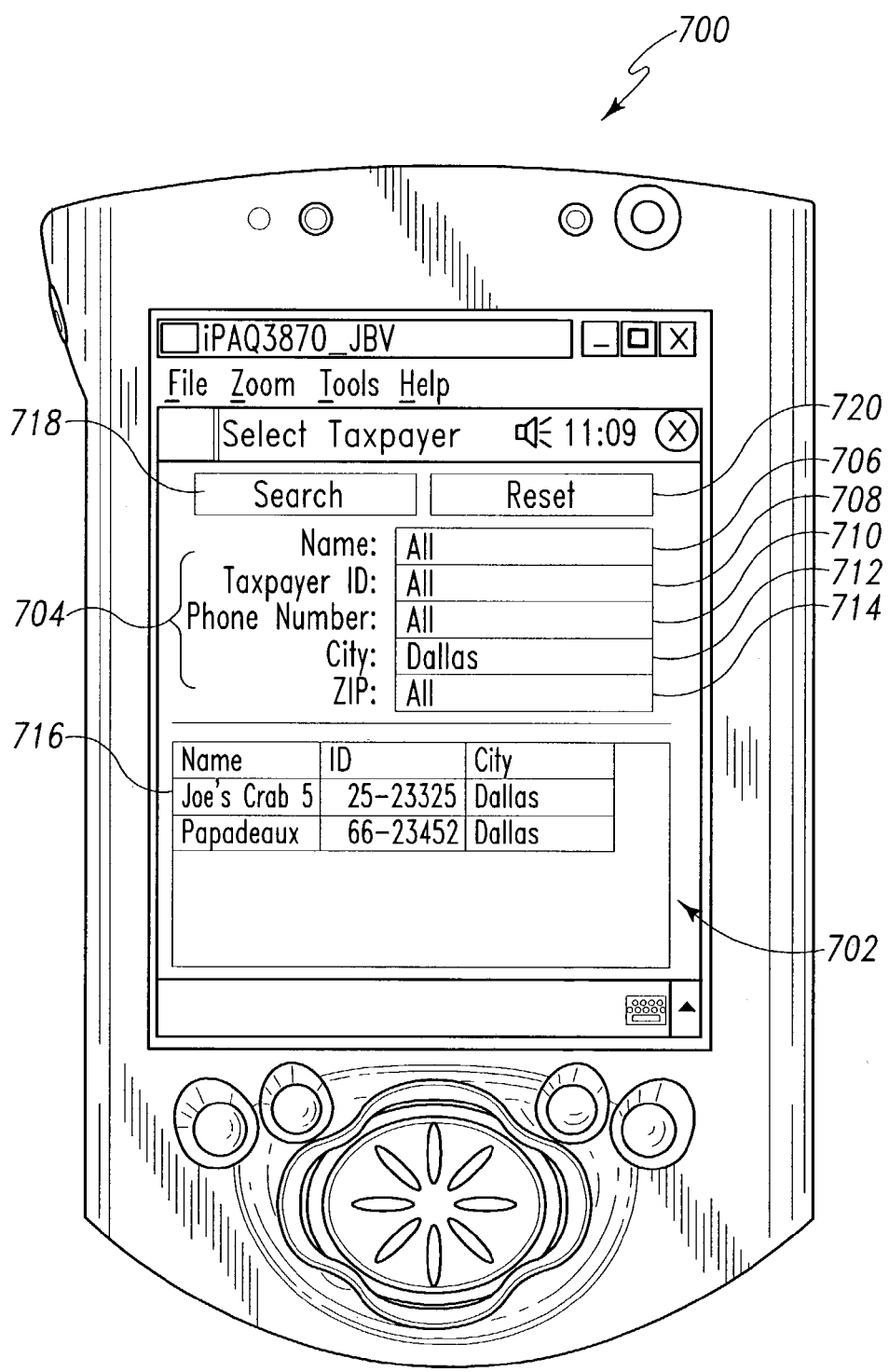
FIG. 7 illustrates a representative a collection case search graphical user interface of the mobile collection application.

Referring to FIG. 7, selection of the collection case inventory component 502 may start a collection case search component 700. The collection case search component 700 may generate a collection case search GUI 702. The collection case search GUI 702 may include a plurality of collection case data entry fields 704 that allow the field agent to locate and retrieve collection case data that may be stored in the collection database 122. The collection case data entry fields 704 may include a name entry field 706, a taxpayer identification (ID) entry field 708, a phone number entry field 710, a city entry field 712 and a zip code entry field 714.

The field agent may enter data in one or more of the fields contained in the collection case data entry fields 704 to search for a particular collection case or entity. A search results field 716 may also be included in the collection case search GUI 702 that displays the results to a search request that may be entered by the field agent. Although not specifically illustrated, the search results may also be displayed in a separate window or GUI if the search results field 716 is not present in the collection case search GUI 702.

A search request may be entered by selecting one of the data entry fields 704 and entering data that may be relevant for that particular data entry field 704. In FIG. 7, the city of Dallas has been entered into the city entry field 712 for illustrative purposes only. Once data has been entered in at least one of the data entry fields 704, the field agent may select a Search icon 718 on the collection case search GUI 702 that causes the collection case search component 700 to transmit a search request to the collection data center server 120.

In response to the search request sent by the wireless pocket PC 102, a search result may be generated by the collection data center server 120 that is responsive to the search request entered by the field agent. The search result may be obtained by the collection data center server 120 by locating the requested information in the collection database 122. Once the requested data is located, the search result may be transmitted to the wireless pocket PC 102 from the collection data center server 120.

The wireless pocket PC 102 may then display the search results in the search results field 716 or on a separate search results GUI. Referring collectively to FIGS. 6 and 7, the field agent may select a collection case from the list of collection cases 604 or from the search results listed in the search results field 716. As set forth in greater detail below, after selecting a respective collection case, details about the selected collection case are displayed to the field agent on the wireless pocket PC 102.

As illustrated in FIG. 7, a Reset icon 720 may clear data entries that have been placed in the data entry fields 704. This allows the field agent to enter another search using the data entry fields 704 if the first search did not retrieve the desired collection case. The Reset icon 720 may also clear search results that are generated and displayed in the search results field 716. As such, during operation the Reset icon 720 may be used to start or initiate a new search for a collection case of interest by the field agent.

Figure 8:
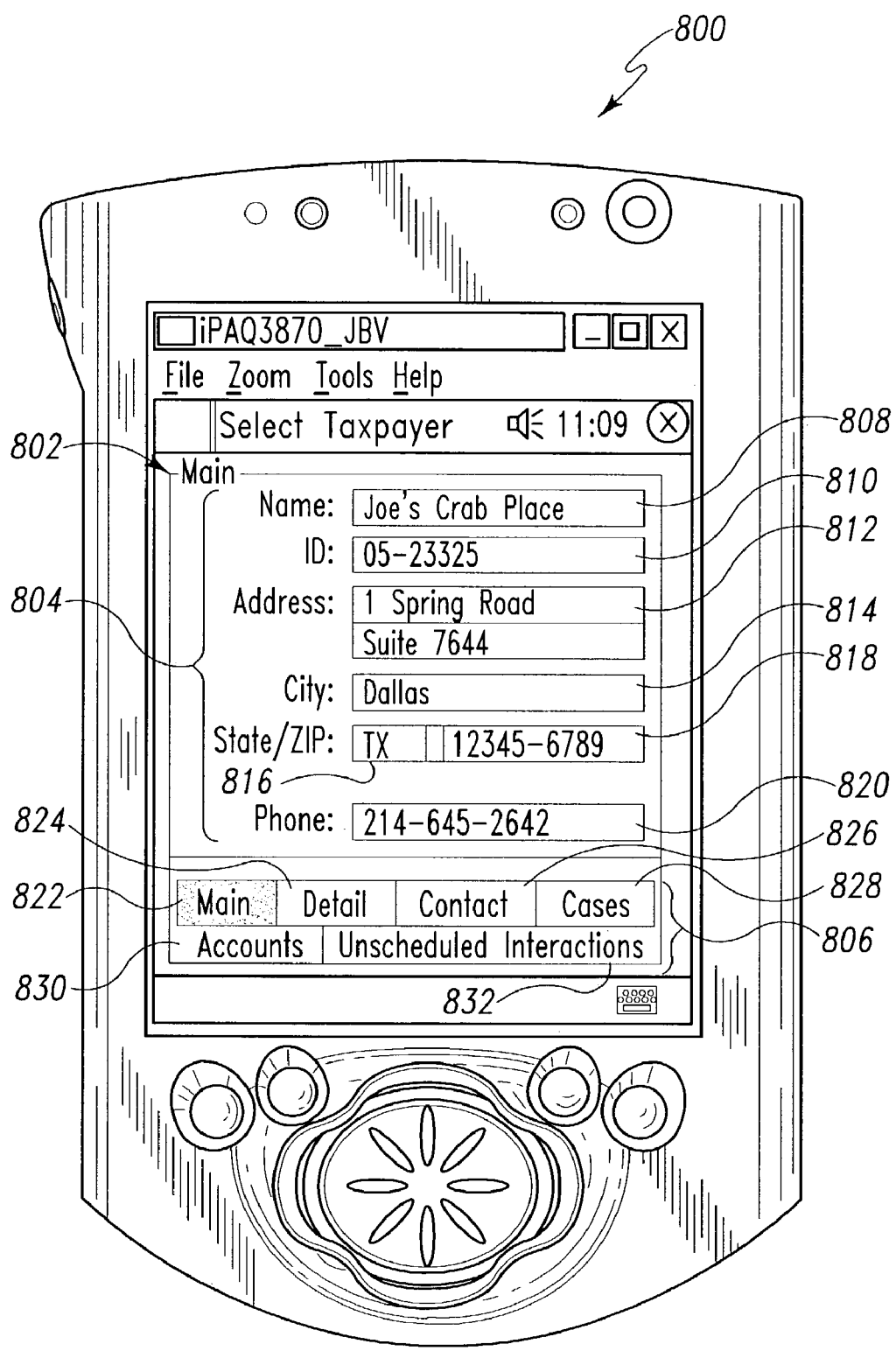
FIG. 8 illustrates a representative collection case display of the mobile collection module.

Referring to FIG. 8, selection of a collection case from the list of collection cases 604 or the search results field 716 may start or initiate a case display component 800. The case display component 800 may generate a case display GUI 802. The case display GUI 802 may include a case information field 804 and a case detail selection field 806. The case information field 804 may include a name field 808, an identification (ID) field 810, an address field 812, a city field 814, a state field 816, a zip code field 818 and a phone number field 820. The information provided in all of these fields may be sent from the collection data center server 120 or already stored on the wireless pocket PC 102 if the collection data was already transferred from the collection data center server 120.

The case detail selection field 806 may include a Main selection icon 822, a Detail selection icon 824, a Contact selection icon 826, a Cases selection icon 828, an Account selection icon 830 and an Unscheduled Interactions selection icon 832. The Main selection icon 822 is associated with the case display GUI 802 set forth in FIG. 8. As illustrated, general information about the entity associated with the collection case is displayed in the case display GUI 802.

Although not illustrated in FIG. 8, selection of the Detail selection icon 824 may generate a collection case detail GUI (see FIG. 9) that provides various types of additional data about the entity being analyzed by the field agent. The collection case detail GUI provides a detailed collection case report. The Contact selection icon 826 may generate a contact GUI that may provide information about managerial personnel at the entity. The Cases selection icon 828 may generate a case GUI that provides details about current cases associated with the entity. The Account selection icon 830 may generate an account GUI that provides information about the type of collection accounts that are associated with the entity and a history of the account. The Unscheduled Interactions selection icon 832 may generate an interaction GUI that provides details of unscheduled visits to the entity and also may provide an input section that allows the field agent to input information about his or her visit or schedule further unscheduled visits with the entity in question.

Figure 9:
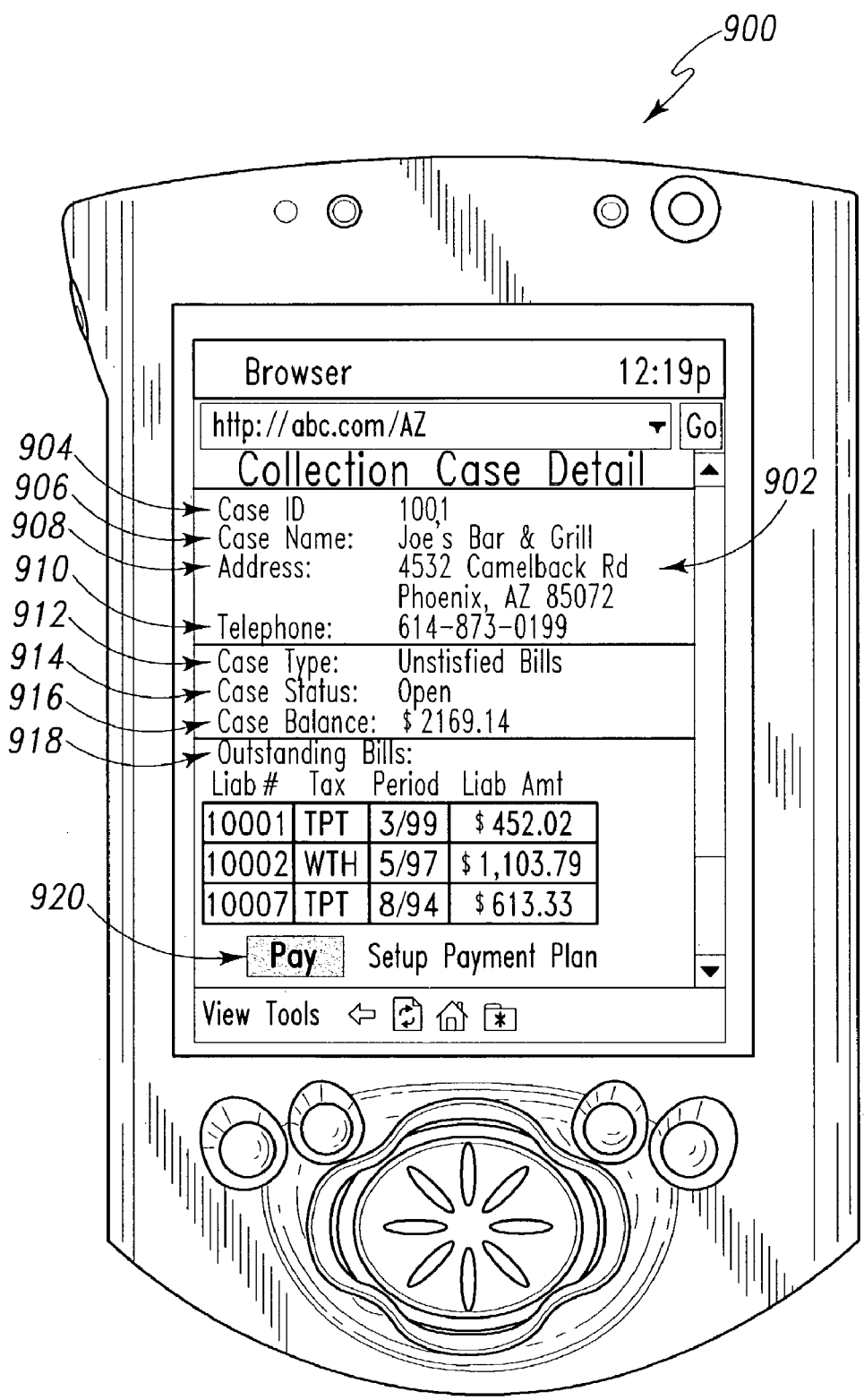
FIG. 9 illustrates a representative collection case detail report graphical user interface generated by the collection case inventory component.

Referring to FIG. 9, if the field agent selects the case detail selection icon 824, a collection case detail component 900 may generate a collection case detail GUI 902 on the wireless pocket PC 102. The collection case detail component 900 may generate a detailed collection case report about the selected collection case. The collection case detail GUI 902 may also be generated at any point in time in which a collection case is selected. As illustrated, the collection case detail GUI 902 may summarize the collection case demographics, outstanding bills, and payment information for the selected collection case or entity.

Referring to FIGS. 1 and 9, to generate the collection case detail GUI 902, the wireless pocket PC 102 may connect to the collection data center server 120, which retrieves the information or account data from the collection database 122. In the alternative, the information or account data for each collection case assigned to a respective field agent may have previously been transferred to the wireless pocket PC 102, which may occur at login or any other predetermined synchronization period.

As illustrated in FIG. 9, the preferred collection case detail GUI 902 may display the case ID 904 and the case name 906. In addition, the collection case detail GUI 902 may include an address listing 908, a telephone listing 910, a case type listing 912, a case status listing 914, a case balance listing 916 and an outstanding bills field 918. The outstanding bills field 918 may include a listing of all of the outstanding bills and liabilities for the entity in question. As illustrated, the outstanding bills field 918 set forth in FIG. 9 includes a liability number, a tax type indication, a period indication and a liability amount indication for each respective type of liability or debt owed. Other information or data may also be listed in the outstanding bills field 918 and as such, the outstanding bills field 918 set forth in FIG. 9 should not be viewed in an illustrative sense and should not be construed as a limitation of the present invention.

Although not specifically illustrated, a payment history listing may also be displayed in the collection case detail GUI 902, as well as any other relevant information. In addition, although not specifically illustrated the field agents may also have the ability to drill-down on individual liabilities in a case and retrieve more specific details about a particular liability listing. The collection case detail GUI 902 may also include a payment plan selection icon 920 that leads field agents to a payment plan component 1000, which is set forth in FIG. 10. As set forth above, the wireless pocket PC 102 may connect to the collection data center server 120 and retrieve information from the collection database 122 using one of the several means of data transfer across the wireless access network 104 set forth above.

Figure 10:
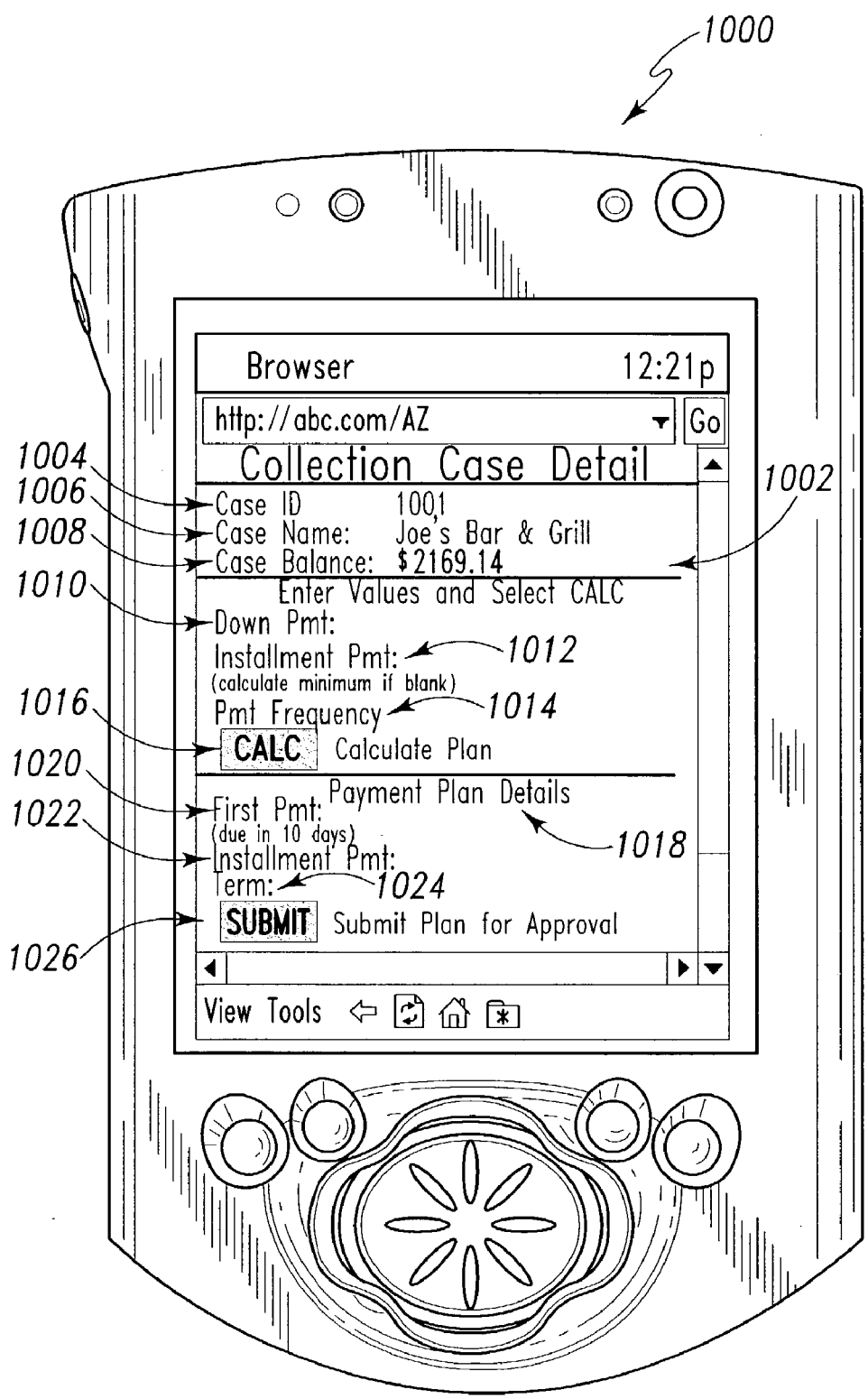
FIG. 10 illustrates a payment plan component of the mobile collection application.

Referring to FIG. 10, the payment plan component 1000 may generate a payment plan GUI 1002 that allows field agents to calculate and create payment plans with debtors. As illustrated, selection of the payment plan selection icon 920 in the collection case detail GUI 902 brings up the payment plan GUI 1002 of the mobile collection application 200. The payment plan component 1000 allows field agents to calculate proposed payment plans based upon payment plan frequency and amount due in order to work out an acceptable payment plan with the debtor. The payment plan presented to the entity may be calculated according to preset guidelines stored in the collection data center server 120 or the wireless pocket PC 102. As illustrated, the payment plan GUI 1002 may include a case identification (ID) field 1004, a case name field 1006 and a case balance field 1008.

In order to setup a payment plan, the field agent may enter a down payment in a down payment field 1010, an installment payment in an installment payment field 1012 and/or a payment frequency in a payment frequency field 1014. The down payment field 1010 may allow the field agent to enter an amount that will be paid by the debtor at that particular time or as a down payment on the debt that is owed. The installment payment field 1012 may allow the field agent to enter an amount that the debtor feels they can pay in installments to satisfy the outstanding debt. The payment frequency field 1014 may allow the field agent to choose a time period in which payments should be made such as weekly, monthly quarterly or yearly for example.

Based on the values of the above-referenced entries, the payment plan component 1000 is operable to calculate a payment plan once a Calculate payment plan icon 1016 is selected by the field agent. The payment plan component 1000 may also calculate the payment plan as the entries are entered thereby eliminating the need for the Calculate payment plan icon 1016. Once the calculate payment plan icon 1016 is selected, a payment plan details field 1018 may display the details of the payment plan to the field agent for discussion and review with the debtor.

The payment plan component 1000 may then display a first payment amount 1020, an installment payment amount 1022 and a payment term 1024. If the payment plan is acceptable to the debtor, the field agent may select a Submit payment plan icon 1026 on the payment plan GUI 1002 that may cause the wireless pocket PC 102 to transmit the details of the payment plan to the collection data center server 120 for approval.

If the payment plan is accepted or approved, the collection data center server 120 will transmit an acknowledgment to the wireless pocket PC 102 and update the collection database 122 with the details of the payment plan as it relates to that particular debtor. The wireless pocket PC 102 can also wait to submit the payment plan to the collection data center server 120 at a later point in time as well. Although not specifically illustrated, if the payment plan is approved the wireless pocket PC 102 may generate a payment plan receipt that is printed on a printer connected with the wireless pocket PC 102 that may be kept for the debtors records.

Referring once again to FIG. 5, the collection main menu GUI 500 of the mobile collection application 200 may also include a selection icon that provides a link to the payment plan GUI 1002. As set forth in detail above, the payment plan component 1000 allows the field agents to present various types of payment plans to the debtor in an attempt to workout an acceptable payment arrangement with the debtor. If an acceptable payment plan is worked out, it is submitted to the collections data center server 120 for approval. The collection data center server 120 may includes a payment plan approval application that verifies that the proposed payment plan does not violate any department policies and so forth. If the payment plan is approved, the collection database 122 is updated to reflect that the debtor has approved the payment plan.

The collection main menu GUI 500 may also includes a selection icon that provides a link to a department policies component 506. Although not specifically illustrated, the department policies component 506 may provide a plurality of links to information and data files that are stored on web pages on the collection data center server 120 or the wireless pocket PC 102. This information can be used by field agents to locate answers to questions that relate to the policies of the particular enterprise that is using the mobile collection system 100.

As further illustrated in FIG. 5, the collections main menu GUI 500 may also include a synchronization utility component 508. The synchronization utility component 508 may be used to synchronize the wireless pocket PC 102 with the collections data center server 120. Since the wireless pocket PC 102 does not necessarily have to be connected with the wireless access network 104 at all times, the field agent may modify data files that have been transferred to the wireless pocket PC 102 from the collections data center server 120 when dealing with debtors throughout the course of a day. At the end of the day or any other relevant time, the collection files that have been entered or modified may need to be transferred back to the collections data center server 120 so that the modifications or new entries can be stored in the collection database 122.

Referring once again to FIG. 1, the wireless pocket PC 102 may synchronize regularly with the collection database 122 located on the collection data center server 120. As set forth above, field agents will be able to selectively download collection cases to which they are assigned from the collection data center server 120 as well as various other types of information. After working cases by conducting field visits with the debtors, information that field agents have recorded can then be uploaded and posted back to the collection database 122. Preferentially, there may be two options for exchanging or synchronizing data from the wireless pocket PC 102 to the collection data center server 120.

First, with a desktop synchronization option, data is transferred between the wireless pocket PC 102 and the collection database 122 on the collections data center server 120 by physically connecting the wireless pocket PC 102 to the network connection 116. As illustrated in FIG. 1, with this synchronization option, the wireless pocket PC 102 is connected to a desktop terminal 124 that is connected to the network connection 116. For example, the wireless pocket PC 102 may connect to the desktop terminal 124 through a USB connection or a docking station. This may be the most secure method of synchronizing collection data between the wireless pocket PC 102 and the collection data center server 120.

Another way of synchronizing the collection data is through the use of a secure wireless connection. This process would be similar to desktop synchronization, but could occur outside of central offices as a field agent is connected over a secure line, such as a wireless virtual private network (VPN). Similar to dial-up VPN connections, the wireless pocket PC 102 connect through secure "tunnels" and exchange encrypted messages that only the collection data center server 120 and the wireless pocket PC 102 can "unlock".

In the preferred embodiment of the present invention, the mobile collection system 100 seamlessly integrates core collection data and makes this information available to field agents. The use of the wireless pocket PC 102 eliminates the need for issuing costly and large laptop computers to field agents. The mobile collection system 100 is easy to use and reduces the training time of new field agents. In addition, the mobile collection system 100 reduces the dependence on paper-based collection cases as all critical information about collection accounts can be accessed by the wireless pocket PC 102. The mobile collection system 100 provides field agents with effective organizational and time management tools that are included on the wireless pocket PC 12. Wireless connectivity enables field agents to have access to current, up-to-date account information at any time.

A wireless pocket PC 102 not only more effectively meets the needs of field agents than a laptop computer; it also greatly improves the efficiency and effectiveness of the field agent. It enables the field agent to conduct and complete all aspects of the collection visit and the resolution of the delinquent account without the need to return to the office or revisit the debtor.

In addition to the routine collection activities described, the mobile collection application 200 will support other compliance activities conducted in the field, such as validating licenses and registrations, registering and licensing taxpayers, and the preparation and filing of tax returns remotely. Field agents are able to remotely look-up the registration and account status of individuals and business not specifically included in their collection case inventory. For instance, at state fairs and other events, field agents can verify the validity of registration information, identify tax periods for which returns have not been filed, and identify outstanding liabilities. The mobile collection application 200 may include functions that enable field agents to remotely register a new business and electronically prepare and accept tax returns at the location of the taxpayer, whether that is an established business location or a temporary/location such as a booth at a fair or similar event.

Figure 11:
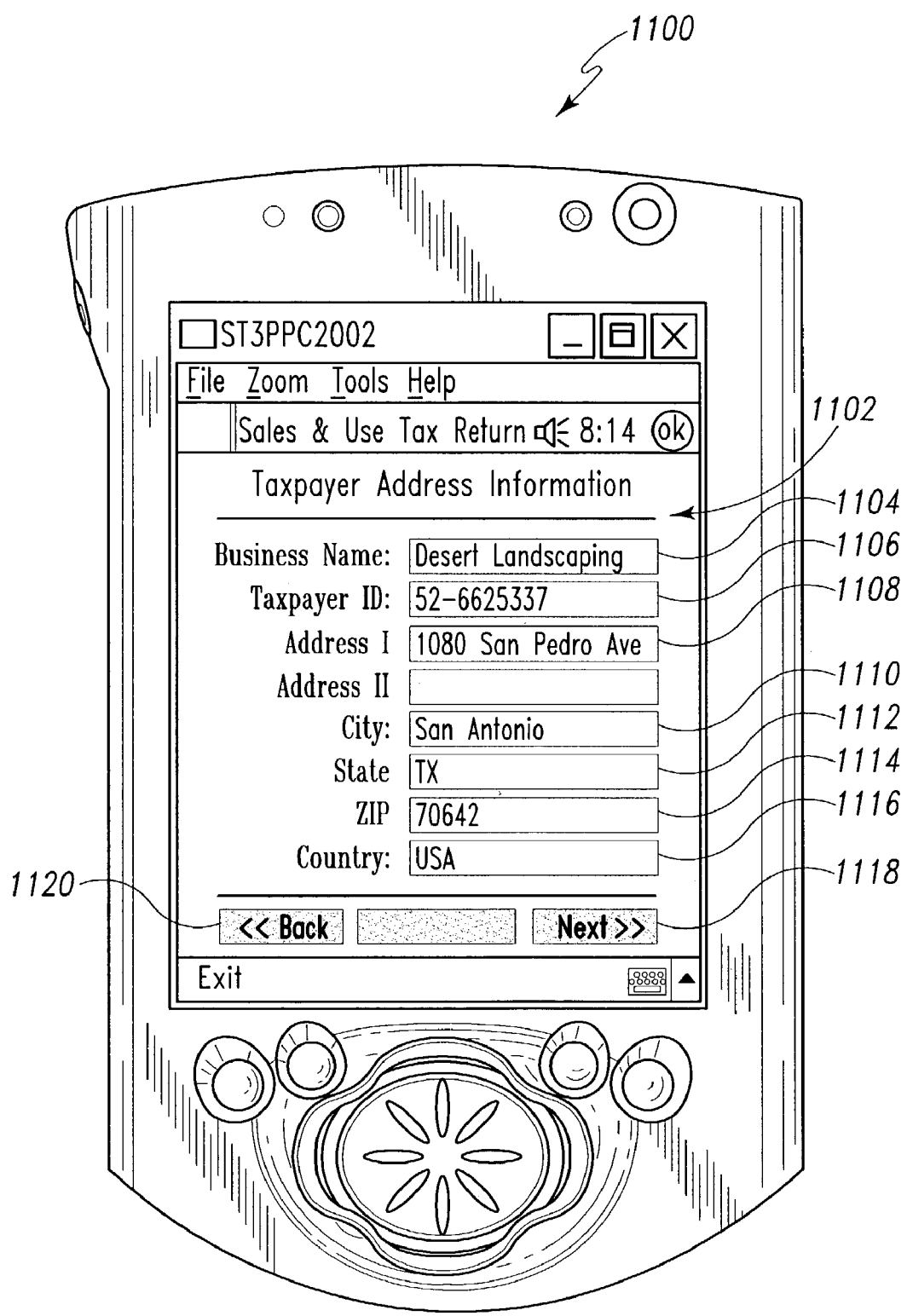
FIG. 11 illustrates a representative mobile registration graphical user interface of a taxpayer registration module of the mobile collection application.

Referring to FIG. 11, the mobile collection application 200 may also include a taxpayer registration module 1100 that allows a field agent to register taxpayers at remote locations. The taxpayer registration module 1100 allows for the registration of permits, licenses and tax payment information from a remote location (i.e.—registration of a transitory vendor at locations such as state fairs, art shows, festivals, flea markets or any other type of non-office based vendor). The taxpayer registration module 1100 enables completing the registration process prior to the end of the event, which would not be practical without a remote real time mobile application.

In other embodiment of the present invention, the taxpayer registration module 1100 may be used to register individuals for permits and licenses to operate at specific locations. As such, in this embodiment, if a vendor needs a permit or license to operate at a specific event, the field agent may use the wireless pocket PC 102 to register the vendor. In addition, the field agent may use the wireless pocket PC 102 to print a permit or license for the specific vendor to operate during the event. A printer connected to the wireless pocket PC 102 may be used to print the permit and the information entered by the field agent will be transmitted to the server 120 for storage in the database 122. The field agent is capable of creating a record for transient or one-time vendors that participate in events.

The taxpayer registration module 1100 may generate a mobile registration GUI 1102 on the wireless pocket PC 102 using a taxpayer registration component. The mobile registration GUI 1102 may include a business name entry field 1104, a taxpayer identification (ID) field 1106, an address entry field 1108, a city field 1110, a state entry field 1112, a zip code entry field 1114 and a country entry field 1116. The field agent may use the mobile registration GUI 1102 to input information about a taxpayer in the provided fields, which allows the collection data center server 120 to create a record in the collection database 122 associated with that particular taxpayer or entity. The value placed in the taxpayer ID field 1106 may automatically be generated by the collection data center server 120. The wireless pocket PC 102 may transmit the data that is entered to the collections data center server 120 as it is entered or at any periodic time. To proceed to the next section of the registration process, the field agent may select a Next icon 1118 or may save the record or go back to another section by selecting a Back icon 1120.

Figure 12:
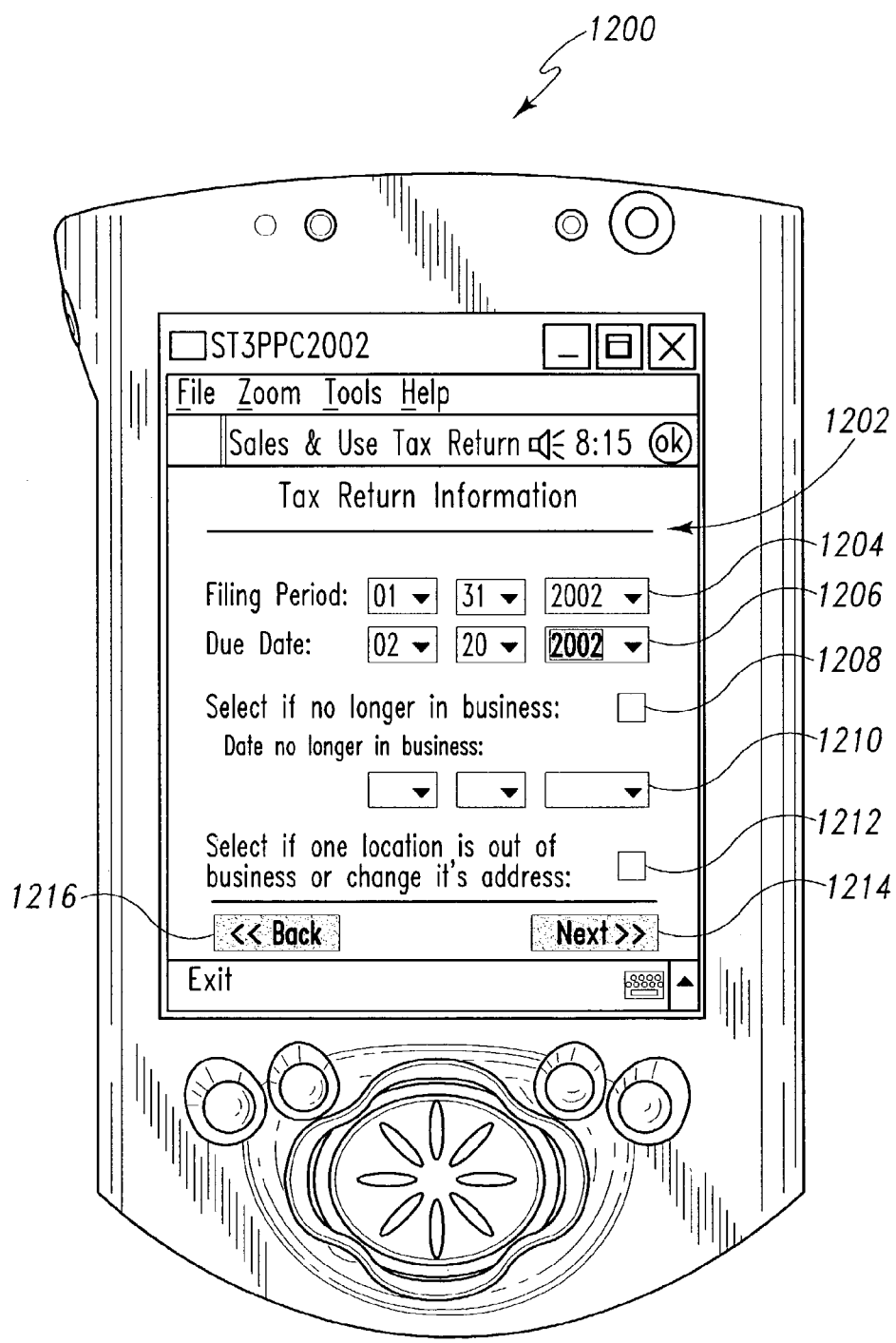
FIG. 12 illustrates a representative tax return information graphical user interface of the taxpayer registration module.

Referring to FIG. 12, the taxpayer registration module 1100 may include a return information component 1200. The return information component 1200 may generate a return information GUI 1202. The return information GUI 1202 may include a filing period section 1204 and a due date section 1206. These sections may be automatically set to predetermined dates or set by the field agent during a field interview with the taxpayer. In addition, if the entity is no longer in business, the field agent may select a termination icon 1208 and enter a date of termination in a date of termination entry field 1210. A specific location icon 1212 may also be included to provide a link to an additional GUI that allows the entity to indicate the number of locations that may be out of business. To proceed to the next section of the registration process, the field agent may select a Next icon 1214 or may save the record or go back to another section by selecting a Back icon 1216.

Figure 13:
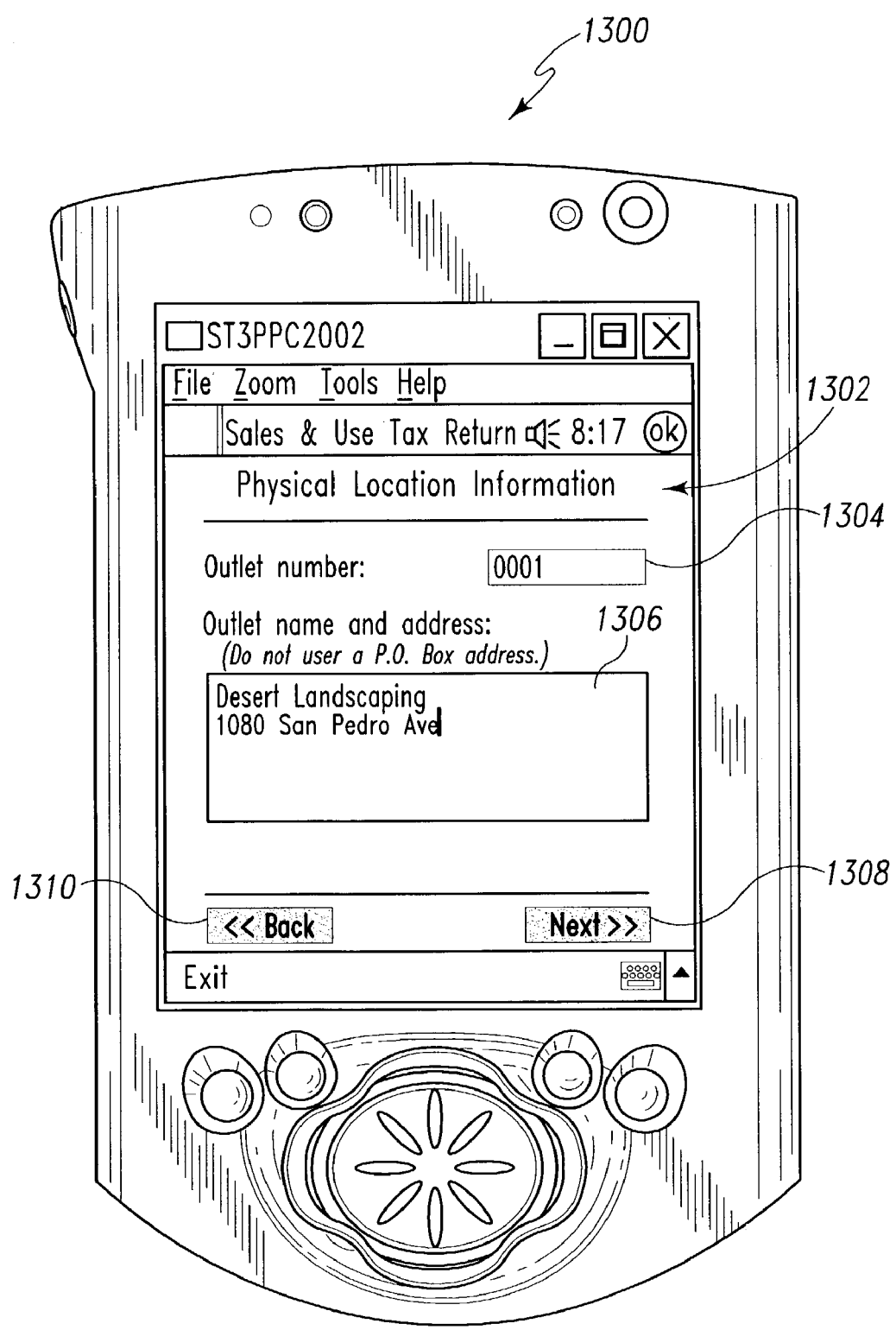
FIG. 13 illustrates a representative outlet information graphical user interface of the taxpayer registration module.

Referring to FIG. 13, the taxpayer registration module 1100 may also include an outlet information component 1300 that allows the taxpayer entity to verify the location that they are registering or making a payment for as some entities may have several outlets or locations. The outlet information component 1300 may generate an outlet information GUI 1302. The outlet information GUI 1302 may allow the field agent to enter or modify information about a particular outlet. The field agent may enter outlets and their respective addresses in an outlet number field 1304 and an address field 1304 or review all of the taxpayer's existing outlet information. In other embodiments, the field agent may enter an outlet number and the information may appear in the outlet address field 1306. To proceed to the next section of the registration process, the field agent-may select a Next icon 1308 or may save the record or go back to another section by selecting a Back icon 1310.

Figure 14:
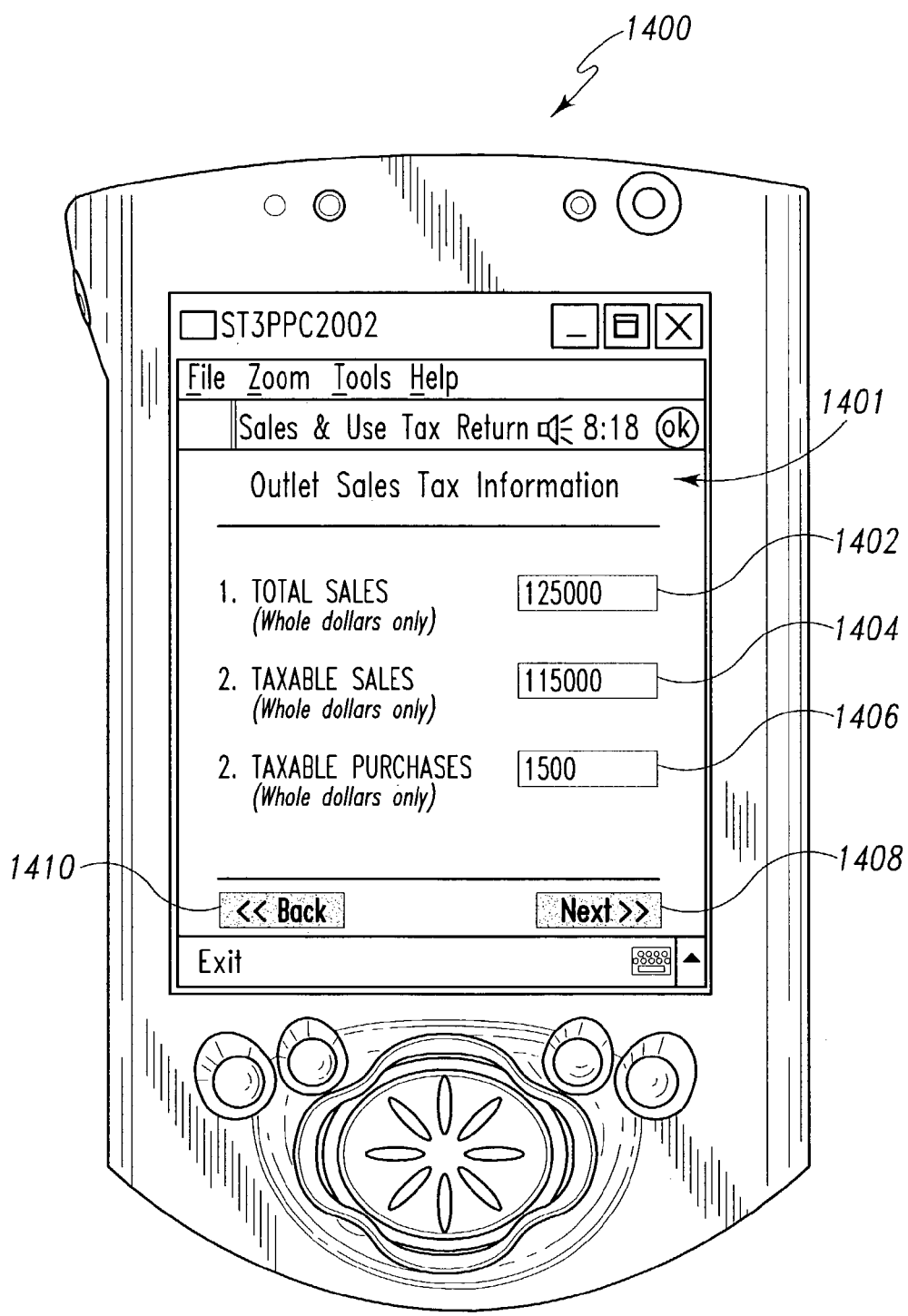
FIG. 14 illustrates a representative sales tax collection graphical user interface of a sales tax collection module.

Referring to FIG. 14, the mobile collection application 200 may also include a sales tax collection module 1400. The sales tax collection module 1400 may generate a sales tax information GUI 1401 on the wireless pocket PC 102. During a field visit, the field agent may enter a total sales amount in a total sales amount field 1402. The total sales entered may be for one particular outlet or more than one outlet or location. A taxable sales amount may also be entered in a taxable amount field 1404. In addition, a taxable purchase amount may also be entered in a taxable purchases field 1406. Again, to proceed to the next section of the registration process, the field agent may select a Next icon 1408 or may save the record or go back to another section by selecting a Back icon 1410.

Figure 15:
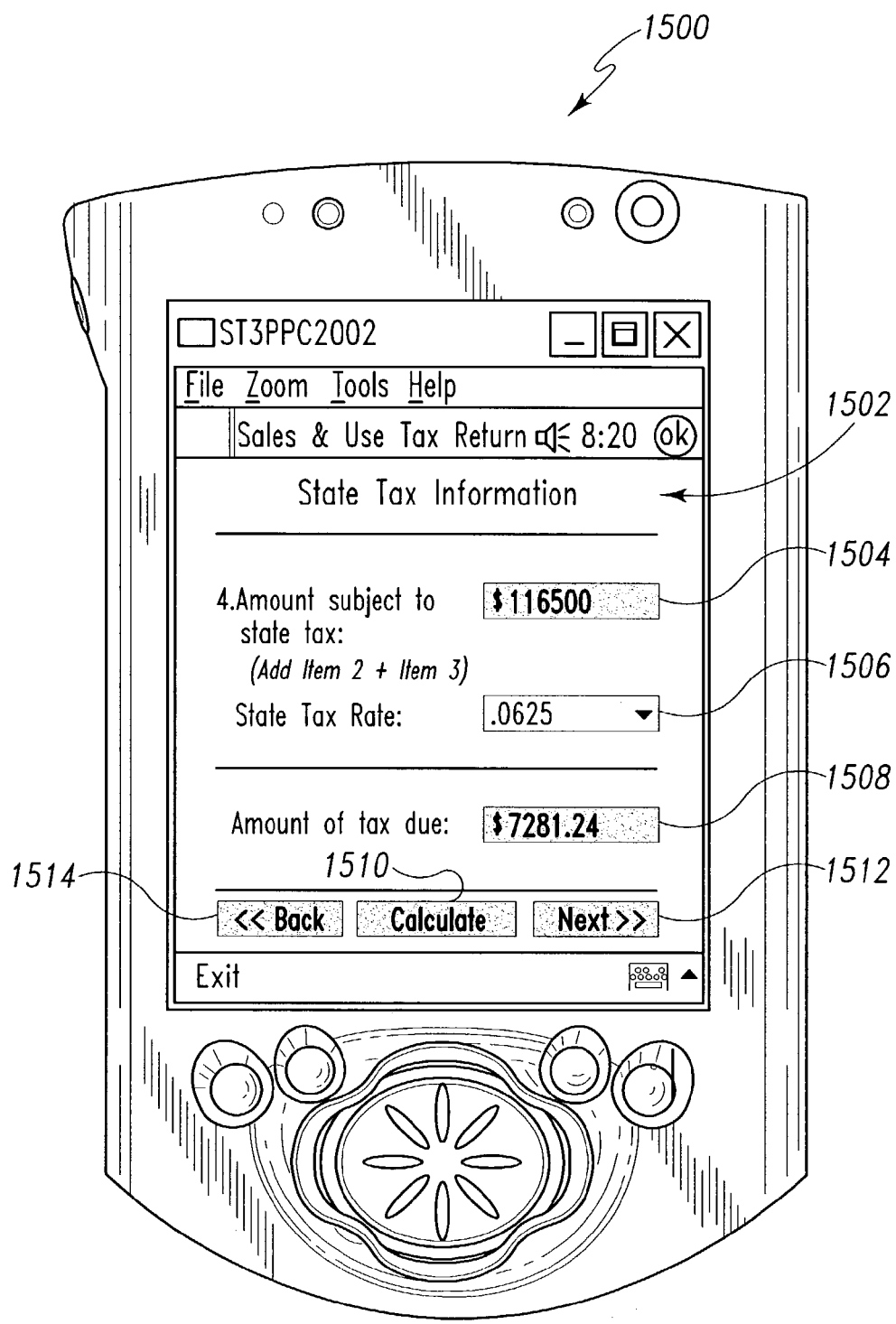
FIG. 15 illustrates a representative sales tax calculation graphical user interface of the sales tax collection module.

Referring to FIG. 15, the sales tax collection module 1400 may also include a state tax calculation component 1500. The state tax calculation component 1500 may include a state tax information GUI 1502 that includes an amount subject to tax field 1504. The amount subject to tax field may be calculated based on the items entered in the sales tax collection module 1400. A state tax rate field 1506 may be included that indicates the tax rate associated with the particular transaction or product the field agent is processing during the field visit. The tax rate in the state tax rate field 1506 may be automatically generated, selected from a list of tax rates or entered by the field agent.

An amount of tax due may be listed in an amount of tax due field 1508 of the state tax information GUI 1502. If the field agent has to select the tax rate, the field agent may use a Calculate icon 1510 to have the state tax calculation module 1500 calculate the amount of tax due or it may occur automatically after the tax rate is selected. As such, the mobile collection application 200 includes a tax calculation application that allows field agents to determine taxes that are due on the spot, which is especially helpful for transient vendors that do not have permanent business locations. A Next icon 1512 may be included for proceeding to the next section and a Back icon 1514 may be included for returning to the previous section.

Figure 16:
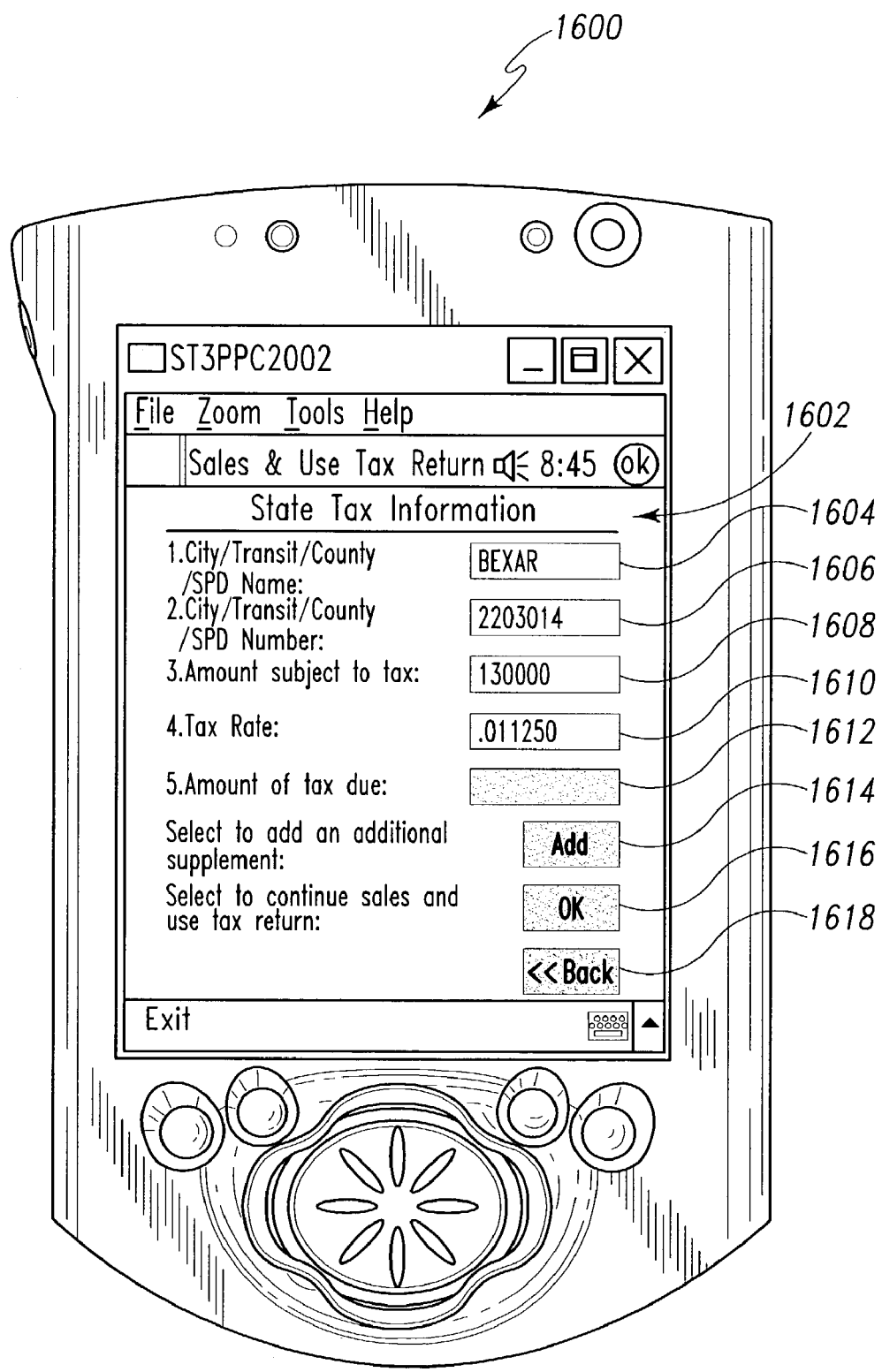
FIG. 16 illustrates a representative supplemental tax graphical user interface of the sales tax collection module.

Referring to FIG. 16, the sales tax collection module 1400 may include a supplemental tax calculation component 1600 that may be an extension of the state tax calculation component 1500. The supplemental tax calculation component 1600 may generate a supplemental tax GUI 1602 on the wireless pocket PC 102. The supplemental tax GUI 1602 may include a city/transit/county/SPD name entry field 1604, a city/transit/county/SPD number entry field 1606, an amount subject to tax field 1608, a tax rate field 1610, and an amount of tax due field 1612. The field agent may enter any of the items listed in the supplemental tax GUI 1602 or the collections data center server 120 may automatically enter them. The supplemental tax calculation component 1600 may also include an add supplemental tax icon 1614 that allows the field agent to add additional supplemental tax data. An OK icon 1616 may be used by the field agent to proceed to the next section or a Back icon 1618 may be used to go back to a previous section.

Figure 17:
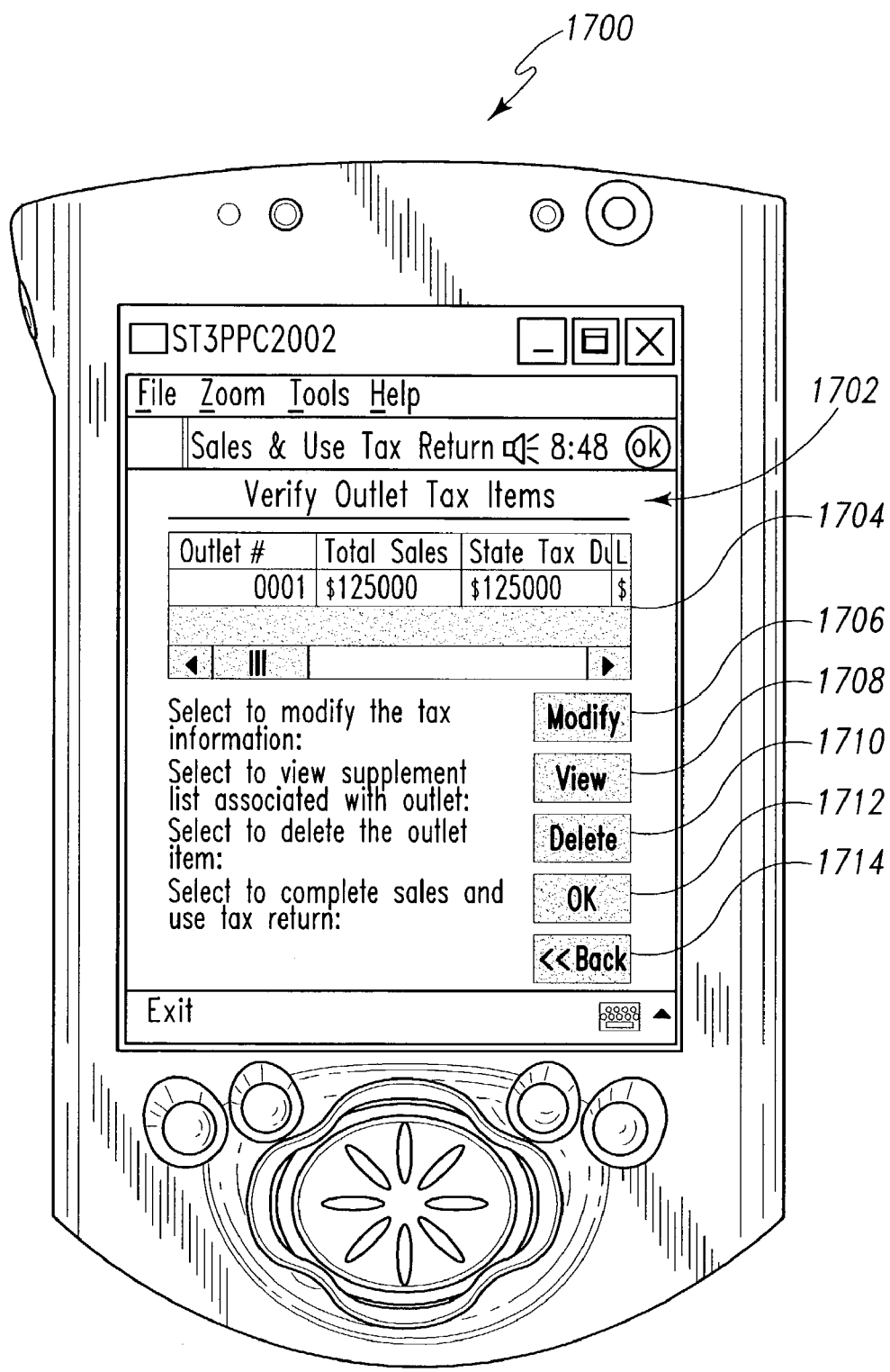
FIG. 17 illustrates a representative verification graphical user interface.

Referring to FIG. 17, the sales tax collection module 1400 may also include a verification component 1700 that may generate a tax verification GUI 1702 on the wireless pocket PC 102. The tax verification GUI 1702 may include an itemized tax field 1704, a Modify icon 1706, a View icon 1708, a Delete icon 1710, an OK icon 1712 and a Back icon 1714. The itemized tax field 1704 may include a list of all of the tax liabilities that are due for that particular outlet or entity. Other information may be included in the itemized tax field 1704 as well, such as an identification number, an outlet number and a total tax due indication. The verification module 1700 may verify taxes for one outlet, several outlets or an entire business entity.

The Modify icon 1706 allows the field agent to go back and modify information that may have been entered in previous sections if an error or problem has occurred. The View icon 1708 may allow the field agent to view a list of the supplemental tax items that are associated with taxpayer. The Delete icon 1710 may allow the field agent to delete the record that has been created for the taxpayer. The proceed or OK icon 1712 allows the field agent to complete the session with the taxpayer. The Back icon 1714 allows the field agent to go back to a previous section or GUI.

Figure 18:
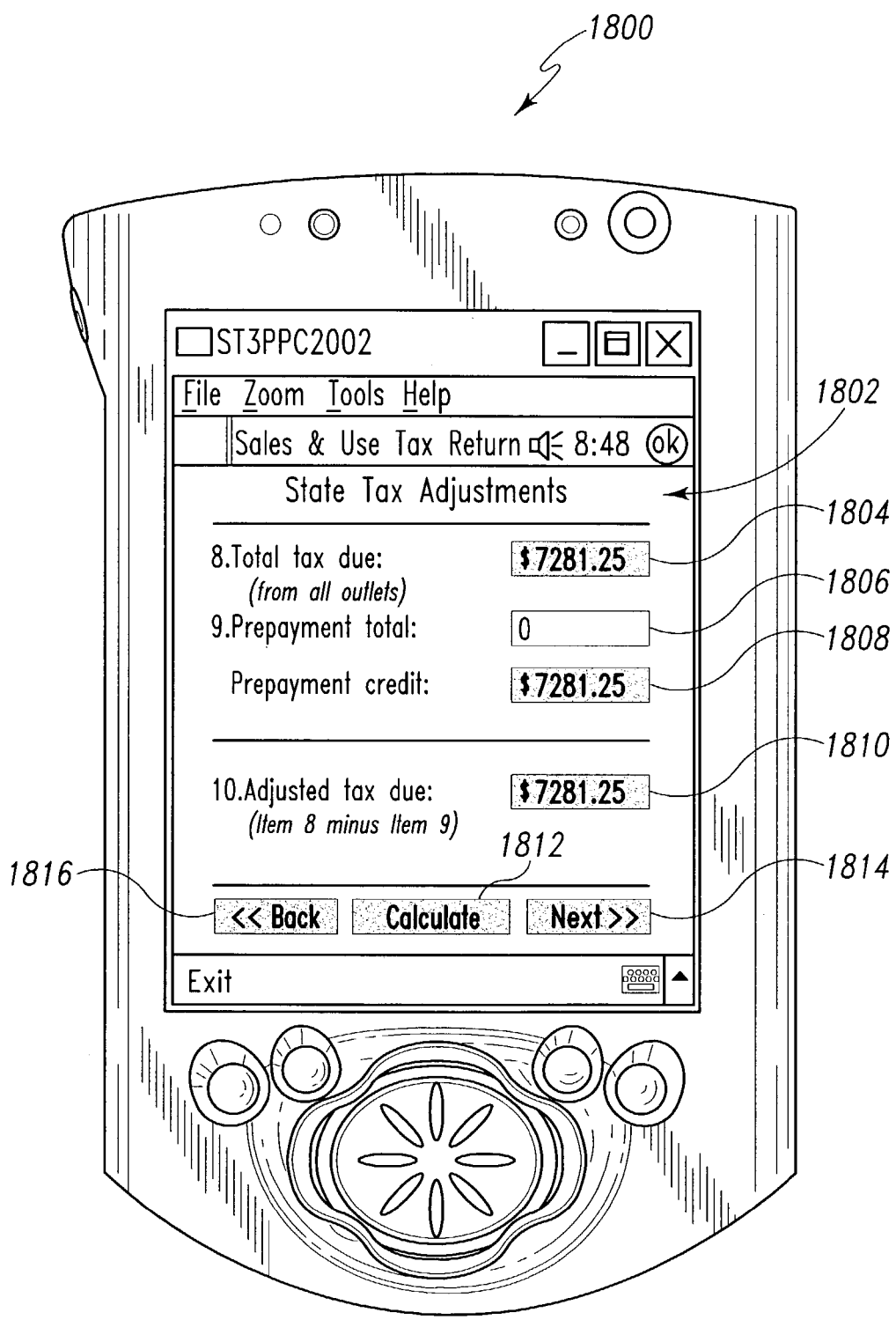
FIG. 18 illustrates a representative tax adjustment graphical user interface.

Referring to FIG. 18, the sales tax collection module 1400 may also include a tax adjustment component 1800 that may allow the field agent to enter any adjustments to the amount of taxes owed by the taxpayer. A tax adjustment GUI 1802 may be generated by the tax adjustment component 1800 that may include a total tax due field 1804, a prepayment field 1806, a payment credit field 1808 and an adjusted tax due field 1810. The tax adjustment component 1800 allows the field agent to adjust the total tax due by deducting prepayment amounts and credit amounts. The adjusted tax due is then calculated by the tax adjustment component 1800 and displayed in the adjusted tax due field 1810 once a Calculate icon 1812 is selected by the field agent. Again, the tax adjustment component 1800 may calculate the adjusted tax due automatically without the necessity of selecting the Calculate icon 1812. A Next icon 1814 may be included for proceeding to the next section and a Back icon 1816 may be included for returning to the previous section.

Figure 19:
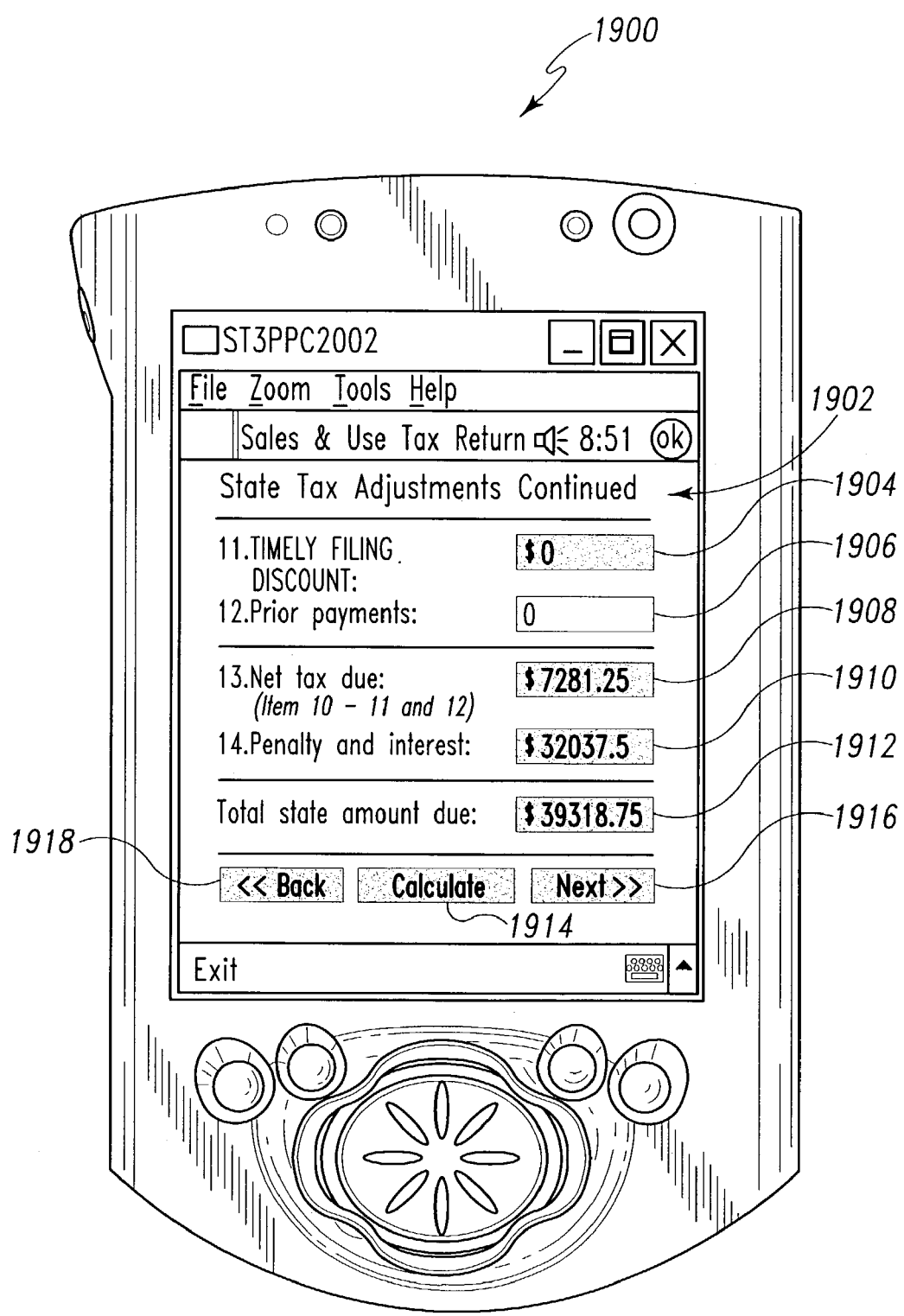
FIG. 19 illustrates a representative second tax adjustment graphical user interface.

Referring to FIG. 19, the tax adjustment component 1800 may also include additional items that are displayed on a second tax adjustment GUI 1902. The second tax adjustment GUI 1902 may include a timely filing discount field 1904, a prior payment field 1906, a net tax due field 1908, a penalty field 1910, and a total tax amount due field 1912. Some taxpayers or governing bodies may offer discounts for timely payment of taxes or offer the taxpayer the ability to make prior payments. Some locations may offer other types of discounts or no discounts at all. Various other types of tax adjustments may be available for a variety of reasons and are envisioned by the present invention.

After these amounts are deducted, the tax adjustment component 1800 may generate a net tax due, which is illustrated in a net tax due field 1908. If there is a penalty associated with the taxpayer's account this amount may be indicated in a penalty field 1910 and then added to the net tax due. The total tax amount that is due may then be set forth in a total tax amount due field 1912. A Calculate icon 1914 may be used by the field agent to calculate the total tax amount due or the tax adjustment application 1800 may do it automatically as values are entered. To proceed to the next section, a Next icon 1916 may be selected by the field agent or the field agent may go back to a previous section by selecting a Back icon 1918.

Figure 20:
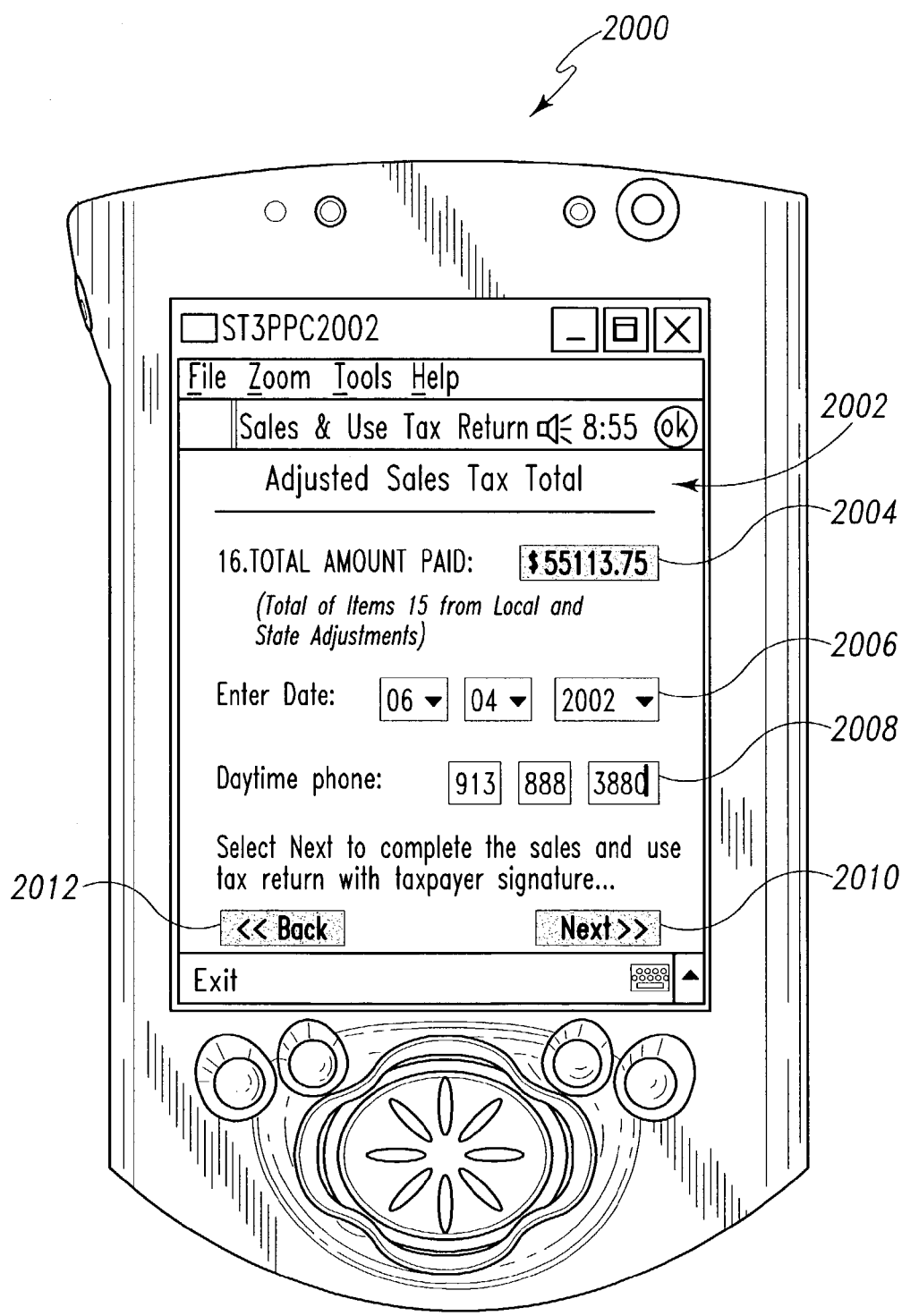
FIG. 20 illustrates a representative adjusted sales tax graphical user interface.

Referring to FIG. 20, an adjusted sales tax component 2000 of the sales tax collection module 1400 may generate an adjusted tax GUI 2002 that sets forth the adjusted total tax. The adjusted tax GUI 2002 may include a total amount paid field 2004 that illustrates the total amount of tax that will be paid by the taxpayer. A date field 2006 may be included that allows the field agent to enter the date that the taxes are being paid, which may be set automatically to the current date. A phone number field 2008 may also be included that allows the field agent to enter a telephone number of the location the field agent is visiting. To proceed to the next section, a Next icon 2010 may be selected by the field agent or the field agent may return to a previous section by selecting a Back icon 2012.

Figure 21:
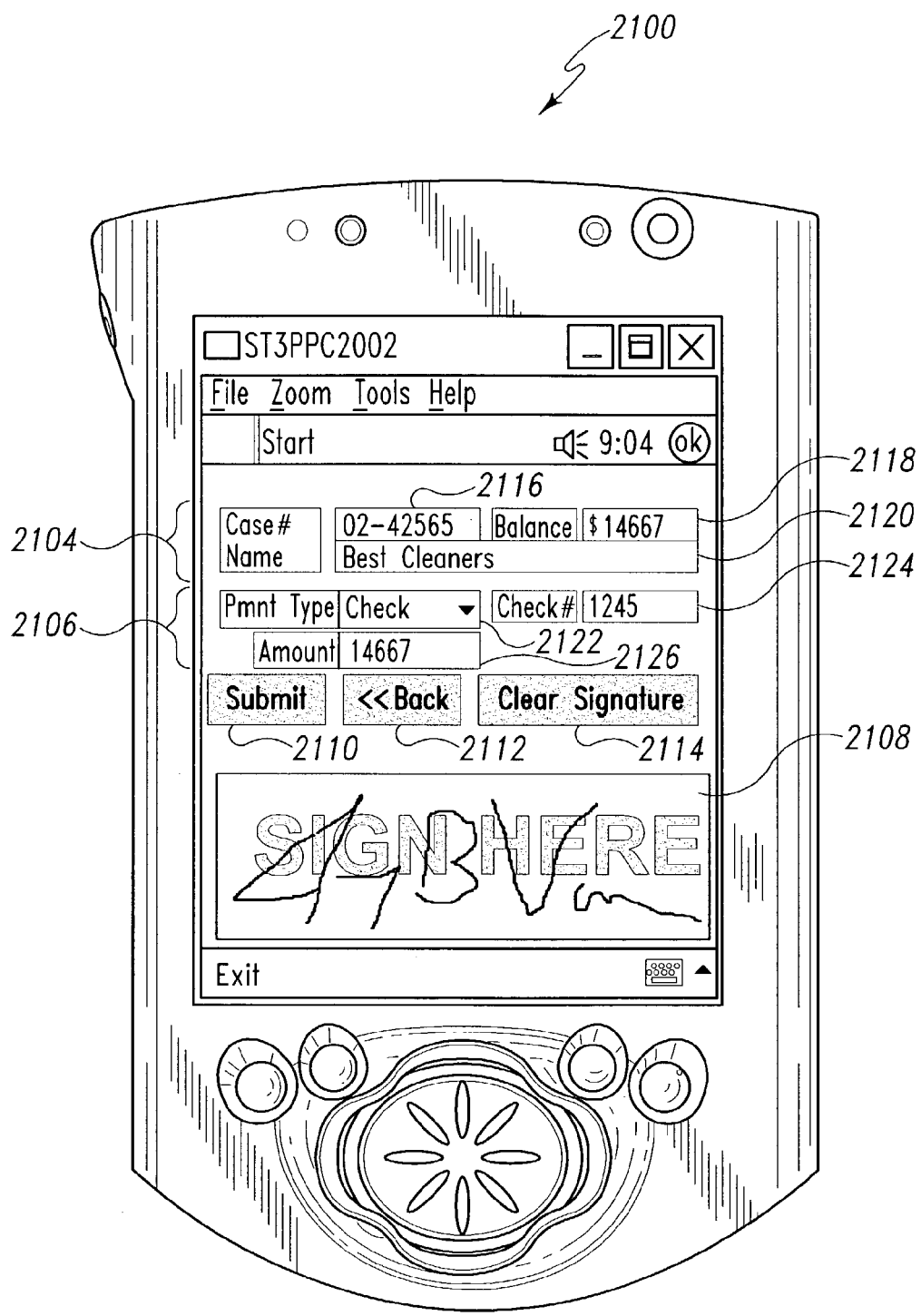
FIG. 21 illustrates a representative payment processing graphical user interface of the sales tax collection module.

Referring to FIG. 21, the sales tax collection module 1400 may include a payment processing component 2100 that may generate a payment processing GUI 2102 on the wireless pocket PC 102. The payment processing GUI 2102 may include a case summary field 2104, a payment field 2106, a signature field 2108, a Submit icon 2110, a Back icon 2112 and a Clear Signature icon 2114. The case summary field 2104 may include a case number indication field 2116, a balance indication field 2118 and a business name field 2120. These items generally summarize what the taxpayer is being charged taxes for and the amount of taxes being charged to the entity set forth in the business name field.

The payment field 2106 allows the field agent to indicate the manner in which the taxpayer is paying for the taxes being assessed. The payment field 2106 may include a payment type selection icon 2122 that allows the field agent to indicate the manner in which the taxpayer is paying for the taxes being assessed. Although a check payment is indicated in FIG. 21, other payment types may also be allowed such as cash or credit card. A check number field 2124 may be included that allows the field agent to enter a check number. If payment is being made with a credit card, this field may be a credit card number field and an expiration date field may also be included. A payment amount field 2126 may also be included that indicates the total amount being paid by the taxpayer. The amount being paid may actually different from the total balance owed if the taxpayer cannot satisfy the entire amount at that particular time.

The signature field 2108 allows the taxpayer to provide a digital signature that is captured by the payment processing module 2100 and transmitted to the collections data center server 120 for storage in the collections database 122. This verifies that the taxpayer reviewed the amount of tax owed and agreed to payment using one of the payment options that may have been selected. The Submit icon 2110 allows the field agent to submit the details of the interaction to the collection data center server 120. The collection data center server 120 then updates the appropriate records or adds the record of the transaction with the taxpayer in the collection database 122. The Back icon 2112 allows the field agent to go back to the previous section and the Clear Signature icon 2114 allows the field agent to clear the signature out of the signature field 2108.

Although not specifically illustrated, the payment processing component 2100 may also be modified to operate as a validation component. The validation component may be used by the field agent to allow a vendor or business person to sign for payment agreements, to validate registration changes, to validate new registrations, and, of course, for filing.

Figure 22:
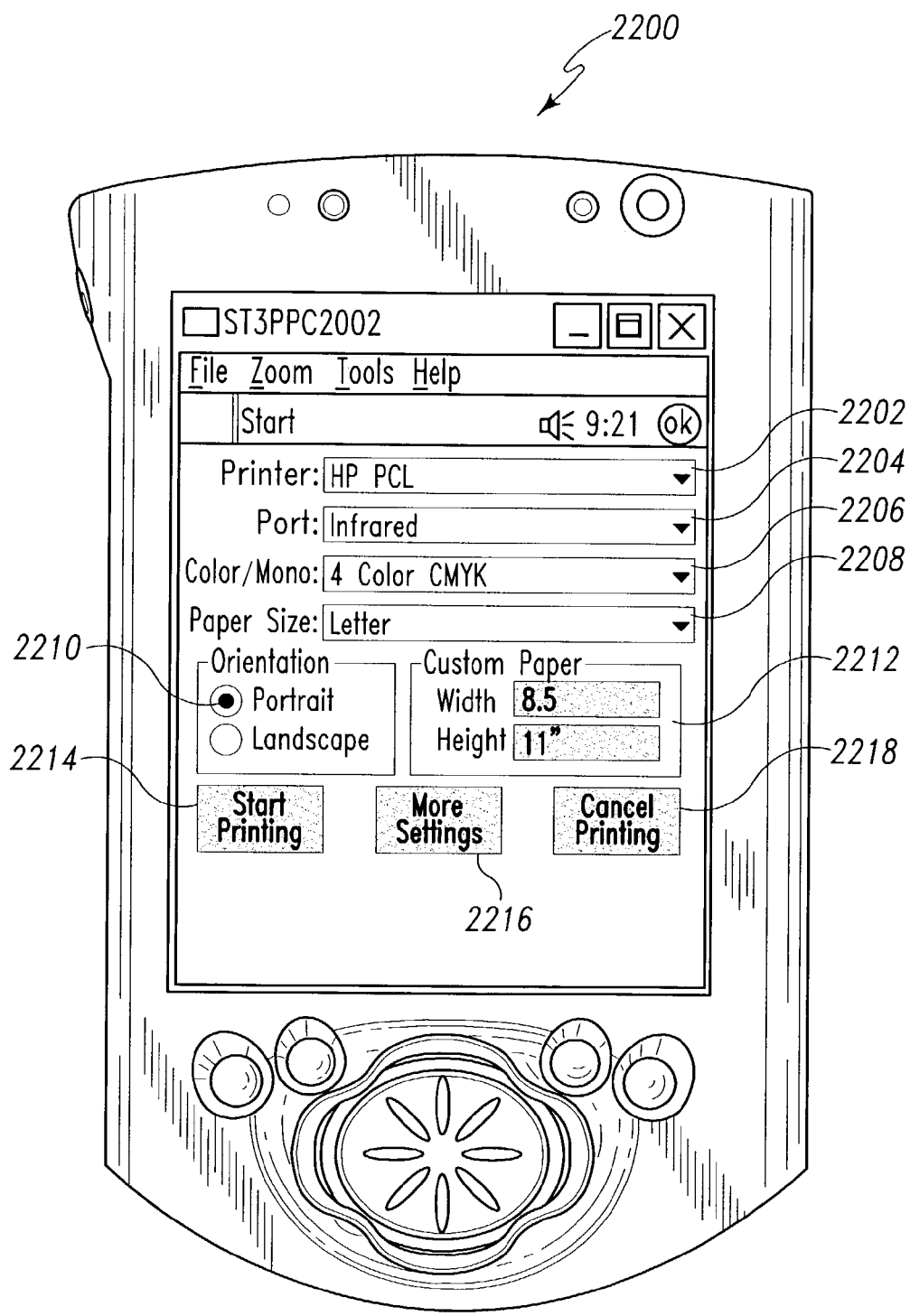
FIG. 22 illustrates a representative print graphical user interface of a print module.

Referring to FIG. 22, a print module 2200 of the mobile collection application 200 allows the field agent to print a paper copy of the screen or report that may be provided to the business entity for their records. Although not illustrated, the wireless pocket PC 102 may be connected with a printer. The wireless pocket PC 102 may use a wireless connection with the printer using a communication protocol such as Bluetooth. The print module 2200 may include a printer field 2202, a port field 2204, a color selection field 2206, a paper size field 2208, an orientation field 2210, and a custom paper type field 2212. Those skilled in the art would recognize the functionality of each of the fields set forth above in the printer application 2200. Selecting a Start Printing icon 2214 will cause the wireless pocket PC 102 to transmit the appropriate data to the printer to make the desired printout. A More Settings icon 2216 will provide a link to more printing options and the Cancel Printing icon 2218 will cancel the print job. Various receipts and records may be printed by the print application 2200.

Figure 23:
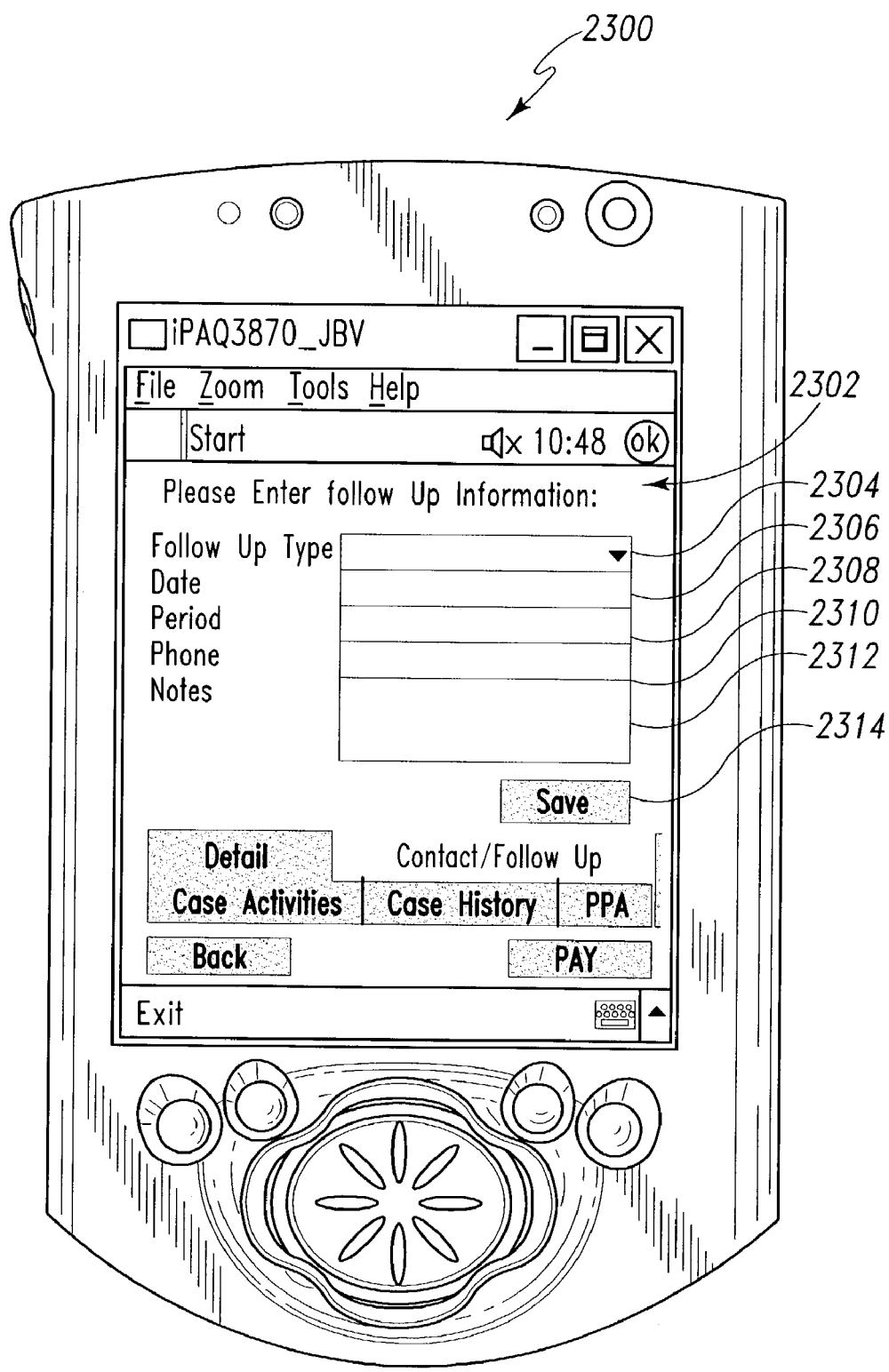
FIG. 23 illustrates a representative follow up graphical user interface of a follow-up module.

Referring to FIG. 23, the mobile collection application 200 may also include a follow up visit scheduling module 2300. The follow-up visit scheduling module 2300 may generate a follow up GUI 2302 on the wireless pocket PC 102 that allows the field agent to enter various types of information. The follow up GUI 2302 may include a follow up type selection field 2304, a date field 2306, a period field 2308, a phone number field 2310 and a notes field 2312. A Save icon 2314 is provided that may save the follow up information in the wireless pocket PC 102 and/or the collection database 122. The mobile collection application 200 may also automatically update the field agent's task list and calendar to reflect the scheduled follow up visit as well.

Although not specifically illustrated, the mobile collection application 200 may also include a voice-over IP (VoIP) application. The VoIP application may route telephone calls to and from field agents in the field. It allows for real time communication between the field agent and any other telephonic device (i.e. having an addressable IP address (i.e. another VoIP device) or phone number). It also enables central office staff to route incoming calls to field agents via the wireless pocket PC 102 without requiring the use of a separate cellular telephone. This is less expensive and more convenient than a mobile telephone.

Although not illustrated, the mobile collection application 200 may also include an investigation application. The investigation application provides mobile support for field investigations—involving criminal activities and bootlegging associated with tobacco products, motor fuels, and beer, wine, and spirits. The wireless pocket PC 102 allows for real time data base lookup of individuals, tax stamps, or other pertinent information that is stored in the host database that will be used in the enforcement of applicable laws. Access to taxpayer and return data will enable field investigators to work more efficiently and quickly determine when continued surveillance is necessary or unwarranted. In addition, it provides a means to validate information discovered during an investigation and to modify enforcement actions as appropriate.

Although not specifically illustrated, it is worth noting that an input device may be used by the field agent to enter data values in the various fields that are used by the mobile collection application 200. The input device may comprise a stylus or pointing device that is used in conjunction with a touch-screen display of the wireless pocket PC 102 or a miniature keyboard that is design to be connected with the wireless pocket PC 102.

In addition, it is also worth noting that several of the modules and components provided by the mobile collection application 200 may be located on the collection data center server 120. During operation, the collection data center server 120 may transmit the functionality of the modules and components to the wireless pocket PC 102 using the wireless access network 104. For example, the mobile collection application may be run as an active server page in a browser on the wireless pocket PC 102. As such, the wireless pocket PC 102 may operate as a dumb terminal and merely process information that is transmitted to it from the collection data center server 120. The wireless pocket PC or terminal 102 may provide a web interface to the mobile collection application 200.

Although not specifically illustrated, each of the software modules and components referred to above is designed to generate GUIs that optimally fit within a display of the wireless pocket PC 102. In a server-based solution, the software modules and component are designed to generate GUIs on the display of the wireless pocket PC 102 in a manner that fits the technical specifications of the display of the wireless pocket PC 102. As such, the GUIs that are generated on the display of the wireless pocket PC 102 are tailored to fit within the display of the device that is being used by the field agent.

While the invention has been described in its currently best-known modes of operation and embodiments, other modes, embodiments and advantages of the present invention will be apparent to those skilled in the art and are contemplated herein.

What is claimed is:

1. A method of providing collection data to a field agent, comprising the steps of:
    logging a wireless pocket personal computer associated with the field agent into a mobile collection application;
    retrieving a list of collection cases from a collection data center server with the mobile collection application;
    displaying the list of collection cases on the wireless pocket personal computer;
    selecting a collection case entry in the list of collection cases; and
    generating a detailed collection case report based on the selected collection case entry.

2. The method of claim 1, where the mobile collection application authenticates the field agent for obtaining access to a collection database located on the collection data center server.

3. The method of claim 1, where the collection case list is tailored specifically for the field agent based on a personal task list associated with the field agent.

4. The method of claim 1, where the collection case list is tailored specifically for the field agent based on a personal calendar associated with the field agent.

5. The method of claim 1, where the detailed collection case report includes a collection case balance.

6. The method of claim 5, where the detailed collection case report includes a link to a payment plan component.

7. The method of claim 6, further comprising the step of selecting the link to the payment plan component.

8. The method of claim 7, further comprising the step of creating a payment plan for the collection case balance with the payment plan component.

9. The method of claim 8, further comprising the step of submitting the payment plan for approval to the collection data center server.

10. The method of claim 9, further comprising the step of updating a collection database located on the collection data center server as a function of the payment plan.

11. The method of claim 10, further comprising the step of printing a receipt that includes a summary of the payment plan with a printer connected with the wireless pocket personal computer.

12. A mobile collection system, comprising:
    a collection data center server including a collection database connected with a wireless access network;
    a wireless pocket personal computer connected with the collection data center server through the wireless access network;
    an authentication module for logging a field agent into a mobile collection application located on the wireless pocket personal computer;
    a collection case inventory module located on the wireless pocket personal computer for retrieving a list of collection cases from the collection data center server; and
    a collection case detail component for generating a detailed collection case report as a function of a selection of a collection case entry contained in the list of collection cases.

13. The mobile collection system of claim 12, further comprising a payment plan component for setting up a payment plan for a collection case balance associated with the selected collection case entry.

14. The mobile collection system of claim 13, where the payment plan component transmits the payment plan to the collection data center server to obtain a payment plan approval.

15. The mobile collection system of claim 14, where the collection data center server updates a case record associated with the selected collection case entry in a collection database as a function of the payment plan.

16. The mobile collection system of claim 12, where the list of collection cases is generated as a function of an identity associated with the field agent.

17. The mobile collection system of claim 12, where the list of collection cases is generated as a function of a personal task list associated with the field agent.

18. The mobile collection system of claim 12, where the list of collection cases is generated as a function of a personal calendar associated with the field agent.

19. The mobile collection system of claim 12, further comprising a collection case search component for searching a collection database located on the collection data center server for at least one collection case.

20. The mobile collection system of claim 19, where the collection case search component includes at least one search field selected from a group of search fields including a name search field, an identification number search field, a phone number search field, a city search field and a zip code search field.

21. The mobile collection system of claim 12, where the collection case detail component is operable to allow the field agent to modify a data field contained in the detailed collection case report.

22. The mobile collection system of claim 21, further comprising a synchronization component for synchronizing a collection case file associated with the selected collection case entry based on the modification made to the data field.

23. A computer program product for use with a wireless pocket personal computer connected with a collection data center server, comprising:
    computer readable program code for generating a collection case search graphical user interface on a display of the wireless pocket personal computer, where the collection case search graphical user interface includes at least one search entry field;
    computer readable program code for receiving at least one input parameter from the search entry field of the collection case search graphical user interface;
    computer readable program code for transmitting a search request based on the at least one input parameter to the collection data center server;
    computer readable program code located on the collection data center server for generating a response to the search request from the wireless pocket personal computer and transmitting the response to the wireless pocket personal computer; and
    computer readable program code for displaying the response on the display of the wireless pocket personal computer.

24. The computer program product of claim 23, further comprising computer readable program code for logging a field agent into a mobile collection application located on the wireless pocket personal computer.

25. The computer program product of claim 23, where the response is displayed in a search results field of the collection case search graphical user interface.

26. The computer program product of claim 23, where the response includes at least one collection case.

27. The computer program product of claim 25, further comprising computer readable program code for generating a detailed collection case report as a function of a selection of at least one collection case contained in the response.

28. The computer program product of claim 27, further comprising computer readable program code for creating a payment plan for a collection balance contained in the detailed collection case report.

29. A mobile collection application for a wireless pocket personal computer, comprising:
   means for authenticating a field agent to access the mobile collection application;
   means for retrieving a collection case inventory list that includes at least one collection case entry from a collection data center server connected with the wireless pocket personal computer; and
   means for retrieving a detailed collection case report by selecting a respective entry in the collection case inventory list.

30. The mobile collection application of claim 29, where the collection case inventory list is tailored specifically for the field agent.

31. The mobile collection application of claim 29, further comprising means for setting up a payment plan for a collection balance contained in the detailed collection case report.

32. The mobile collection application of claim 31, further comprising means for printing a payment plan receipt.

33. A mobile collection application for a wireless pocket personal computer, comprising:
   means for authenticating a field agent to access the mobile collection application located on the wireless pocket personal computer;
   means for allowing the field agent to search a collection database located on a collection data center server for a respective collection case using the wireless pocket personal computer; and
   means for retrieving a detailed collection case report once the field agent locates a predetermined collection case contained in the collection database.

34. The mobile collection application of claim 33, further comprising means for setting up a payment plan for a collection balance contained in the detailed collection case report.

35. The mobile collection application of claim 34, further comprising means for printing a payment plan receipt.

36. A method of collecting taxes with a wireless pocket personal computer being used by a field agent during a field interview, comprising the steps of:
   generating a taxpayer registration form on a display of the wireless pocket personal computer;
   entering taxpayer registration information in the taxpayer registration form using the wireless pocket personal computer;
   generating a tax calculation form on the display of the wireless pocket personal computer;
   entering sales tax information in the tax calculation form using the wireless pocket personal computer; and
   calculating a total tax amount due based on the tax information entered in the tax calculation form.

37. The method of claim 36, further comprising the step of storing the taxpayer information and the total tax amount due in a collection database on the wireless pocket personal computer.

38. The method of claim 37, further comprising the step of synchronizing the taxpayer information and the total tax amount due with a second collection database located on a collection data server connected with the wireless pocket personal computer through a wireless access network.

39. The method of claim 36, further comprising the step of creating a taxpayer file in a collection database located on a collection data center server connected with the wireless pocket personal computer based on the taxpayer information and the total tax amount due.

40. The method of claim 36, where the tax calculation form comprises a sales tax calculation form including a plurality of data entry fields that may be selected from a group of data entry fields including a total sales data entry field, a taxable sales data entry field, a taxable purchases data entry field and a tax rate data entry field.

41. The method of claim 36, further comprising the step of generating a total amount of tax due display field on the wireless pocket personal computer based on the total tax amount due.

42. The method of claim 36, further comprising the step of generating a verification form on the display of the wireless pocket personal computer that includes an itemized index field that summarizes the field interview.

43. The method of claim 36, further comprising the step of presenting a payment processing graphical user interface on the display of the wireless pocket personal computer.

44. The method of claim 43, where the payment processing graphical user interface allows a taxpayer to pay for the total tax amount due using at least one payment option.

45. The method of claim 44, further comprising the step of printing a receipt with a printer connected with the wireless pocket personal computer.

46. A mobile tax collection system for a wireless pocket personal computer connected with a wireless access network, comprising:
   a mobile registration module for generating a mobile registration graphical user interface on a display of the wireless pocket personal computer that includes a plurality of taxpayer data entry fields;
   a tax information module for generating a tax information graphical user interface on the display of the wireless pocket personal computer that includes at least one tax information entry field;
   a tax calculation module for calculating a total amount of tax due that is displayed on the display of the wireless pocket personal computer;
   a synchronization module for updating a collections database located on a collection data center server connected with the wireless access network.

47. The mobile tax collection system of claim 46, where the tax information entry field may be selected from a group of tax information entry fields including a total sales data entry field, a taxable sales data entry field, a taxable purchases data entry field and a tax rate data entry field.

48. The mobile tax collection system of claim 46, further comprising a verification component for generating a verification graphical user interface on the display of the wireless pocket personal computer that includes a tax verification display field.

49. The mobile tax collection system of claim 46, further comprising a payment processing component for generating a payment processing graphical user interface on the display of the wireless pocket personal computer.

50. The mobile tax collection system of claim 46, further comprising a payment plan component for generating a payment plan for the total amount of tax due that is displayed on the display of the wireless pocket personal computer.

51. A computer program product for use with a wireless pocket personal computer connected with a collection data center server via a wireless access network, comprising:
   computer readable program code for receiving a plurality of taxpayer registration information data entries about a taxpayer;
   computer readable program code for receiving a plurality of tax information data entries from the taxpayer;
   computer readable program code for calculating a total tax amount due as a function of the tax information data entries; and
   computer readable program code for displaying the total tax amount due on a display of the wireless pocket personal computer.

52. The computer program product of claim 51, further comprising computer readable program code for generating a payment processing component on the wireless pocket personal computer.

53. The computer program product of claim 52, further comprising computer readable program code for printing a receipt on a printer connected with the wireless pocket personal computer.

54. The computer program product of claim 51, further comprising computer readable program code for creating a taxpayer information file that is stored in a collection database of the collection data center server including the taxpayer registration information data entries, the tax information data entries and the total tax amount due.

55. A mobile tax collection application for a wireless pocket personal computer, comprising:
   means for generating a taxpayer collection registration form on the wireless pocket personal computer;
   means for entering taxpayer information in the taxpayer collection registration form using the wireless pocket personal computer;
   means for generating a tax information entry form on the wireless pocket personal computer;
   means for entering tax information in the sales tax information entry form using the wireless pocket personal computer; and
   means for calculating a total tax amount due as a function of the tax information entered in the tax information entry form.

56. The mobile tax collection application of claim 55, further comprising means for updating a collection database on a data collection center server connected with the wireless pocket personal computer.

57. The mobile tax collection application of claim 55, further comprising means for paying for the total tax amount due using the wireless pocket personal computer.

58. The mobile tax collection application of claim 55, further comprising means for displaying a tax assessment summary on the wireless pocket personal computer.

59. A method for a field agent to collect tax liabilities from a debtor with a wireless pocket PC, comprising the steps of:
   generating a detailed report of a collection case for the debtor;
   reviewing the detailed report with the debtor;
   creating a payment plan with the debtor; and
   validating the payment plan with the debtor.

60. A method for registering a vendor with a collection agency using a wireless pocket PC, comprising the steps of:
   determining if the vendor is registered to do business in a respective geographic area;
   entering contact information for the vendor if the vendor is not registered; and
   presenting the entered contact information to the vendor for validation; and
   validating the entered contact information.

61. A method for a field agent to review liabilities associated with a debtor using a wireless pocket PC, comprising the steps of:
   entering search criteria in a search component;
   generating a search result including at least one listing;
   selecting a respective listing in the search result; and
   generating a detailed report as a function of the selected listing.

* * * * *

UNITED STATES PATENT AND TRADEMARK OFFICE
CERTIFICATE OF CORRECTION

PATENT NO. : 7,289,794 B2
APPLICATION NO. : 10/391430
DATED : October 30, 2007
INVENTOR(S) : Jeffrey C. Bowne et al.

It is certified that error appears in the above-identified patent and that said Letters Patent is hereby corrected as shown below:

Column 12
Line 12, delete "includes" and insert -- include --.
Line 18, delete "includes" and insert -- include --.

Column 13
Line 62, delete "embodiment" and insert -- embodiments --.

Column 17
Line 26, insert -- be -- between "actually" and "different.".

Signed and Sealed this

Eighteenth Day of March, 2008

JON W. DUDAS
*Director of the United States Patent and Trademark Office*